United States Patent
Mori et al.

(10) Patent No.: US 7,551,666 B2
(45) Date of Patent: Jun. 23, 2009

(54) WIRELESS COMMUNICATIONS SYSTEM AND WIRELESS DIGITAL RECEIVER FOR USE THEREIN

(75) Inventors: Kenichi Mori, Ibaraki (JP); Hitoshi Takai, Toyono-gun (JP)

(73) Assignee: Panasonic Corporation, Osaka (JP)

( * ) Notice: Subject to any disclaimer, the term of this patent is extended or adjusted under 35 U.S.C. 154(b) by 651 days.

(21) Appl. No.: 10/560,622

(22) PCT Filed: Feb. 9, 2005

(86) PCT No.: PCT/JP2005/002386

§ 371 (c)(1),
(2), (4) Date: Dec. 14, 2005

(87) PCT Pub. No.: WO2005/078945

PCT Pub. Date: Aug. 25, 2005

(65) Prior Publication Data

US 2007/0098057 A1 May 3, 2007

(30) Foreign Application Priority Data

Feb. 13, 2004 (JP) ............................. 2004-037507

(51) Int. Cl.
*H04B 1/38* (2006.01)
(52) U.S. Cl. .................. 375/219; 375/220; 375/354; 341/155; 704/205; 370/203
(58) Field of Classification Search .................. 375/219, 375/354; 341/155; 704/205; 370/203
See application file for complete search history.

(56) References Cited

U.S. PATENT DOCUMENTS 5,392,381 A * 2/1995 Furuya et al. ................ 704/205

(Continued)

FOREIGN PATENT DOCUMENTS

| JP | 10-98500 | 4/1998 |
|----|----------|--------|
| JP | 3088893 | 7/2000 |

OTHER PUBLICATIONS

Choi et al.; Relationship Between ADC Performance and Requirements of Digital-IF Receiver of WCDMA Base-Station; IEEE Transcations on Vehicular Technology; vol. 52, No. 5; Sep. 2003; pp. 1398-1408.*

(Continued)

*Primary Examiner*—Sudhanshu C Pathak
(74) *Attorney, Agent, or Firm*—Wenderoth, Lind & Ponack, L.L.P.

(57) ABSTRACT

A base station 2 demodulates a wireless signal after downconverting the signal to a low-frequency signal whose center frequency is fi [Hz] and oversampling the signal. A mobile station 3 demodulates a wireless signal after downconverting the signal to a low-frequency signal whose center frequency is fd [Hz] and undersampling the signal. The same sampling frequency fs [Hz] is used in the base station 2 and in the mobile station 3. The sampling frequency fs [Hz] is set to a value that is an even-number multiple of a wireless symbol transmission rate such that oversampling is done in the base station 2 and undersampling is done in the mobile station 3. The center frequency fi [Hz] is ½ to 1 times a frequency corresponding to the bandwidth and is $\frac{1}{2^N}$ (N is a natural number) times the sampling frequency fs [Hz].

24 Claims, 21 Drawing Sheets

U.S. PATENT DOCUMENTS

| | | | |
|---|---|---|---|
| 6,201,785 B1 * | 3/2001 | Fouche et al. | 370/203 |
| 6,563,862 B1 * | 5/2003 | Knutson et al. | 375/219 |
| 6,654,432 B1 * | 11/2003 | O'Shea et al. | 375/354 |
| 7,253,762 B2 * | 8/2007 | Huang et al. | 341/155 |
| 7,421,048 B2 * | 9/2008 | Ducharme et al. | 375/354 |
| 2001/0046268 A1 | 11/2001 | Sharma | |
| 2003/0153294 A1 | 8/2003 | Hata | |

OTHER PUBLICATIONS

Jan Crols et al., "Low-IF Topologies for High-Performance Analog Front Ends of Fully Integrated Receivers", IEEE Transactions on Circuits and Systems II: Analog and Digital Signal Processing, vol. 45, No. 3, pp. 269-282, Mar. 1998.

Mikko Valkama et al., "Advanced Methods for I/Q Imbalance Compensation in Communication Receivers", IEEE Transactions on Signal Processing, vol. 49, No. 10, pp. 2335-2344, Oct. 2001.

Kiyomichi Araki ed., "Software Musen No Kiso To Oyo (Basics and Applications of Software Radio)", SIPEC Corporation Knowledge Service Department, p. 123, Oct. 2002.

"Dedicated Short-Range Communication System, ARIB Standard", STD-T75, Ver. 12, p. 33, Sep. 2001.

* cited by examiner

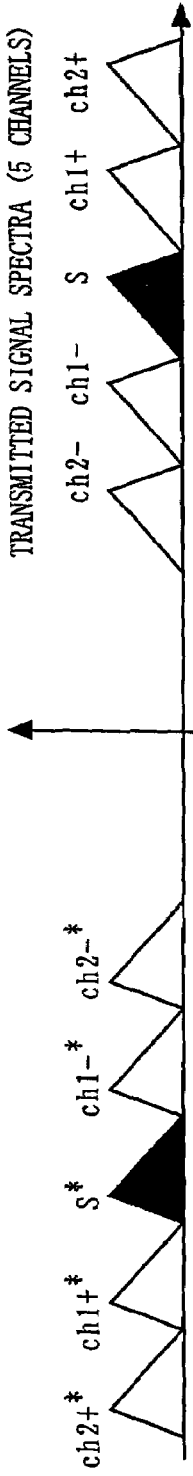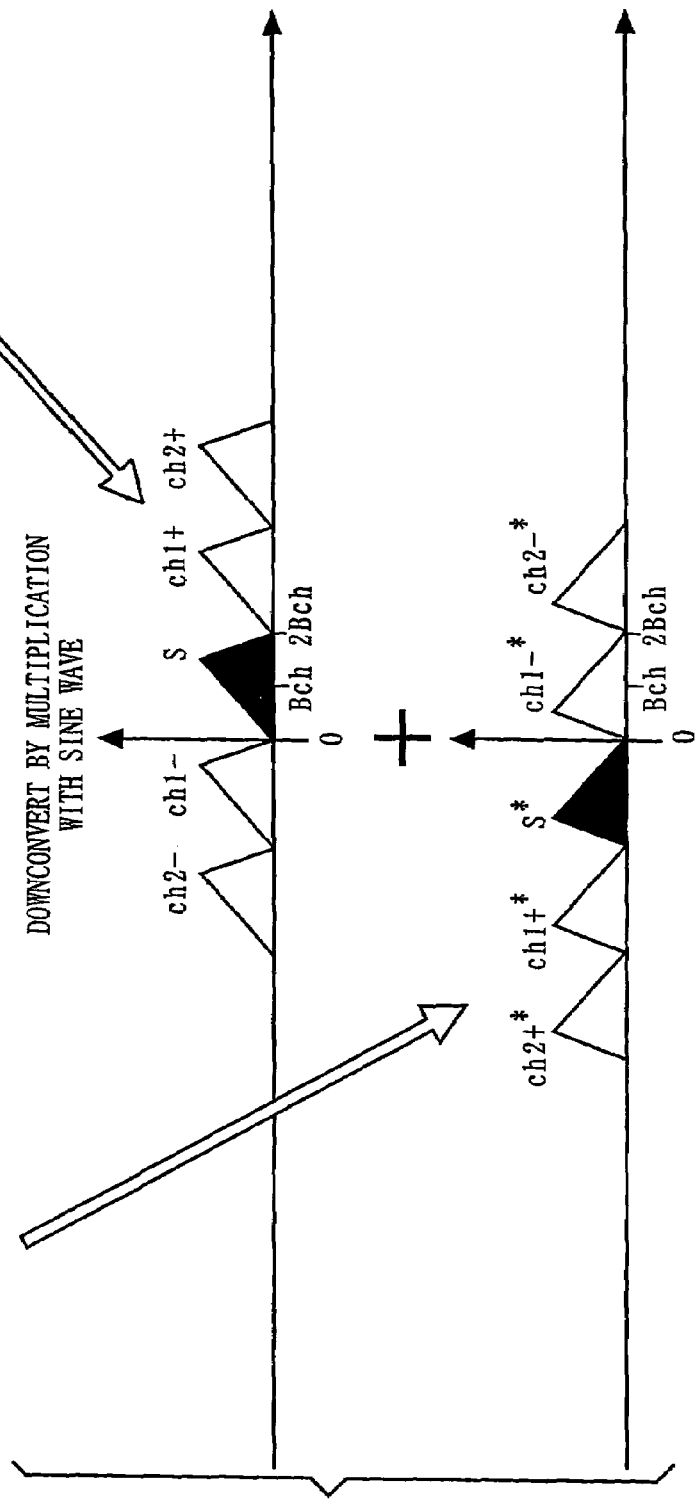
FIG. 6A
FIG. 6B

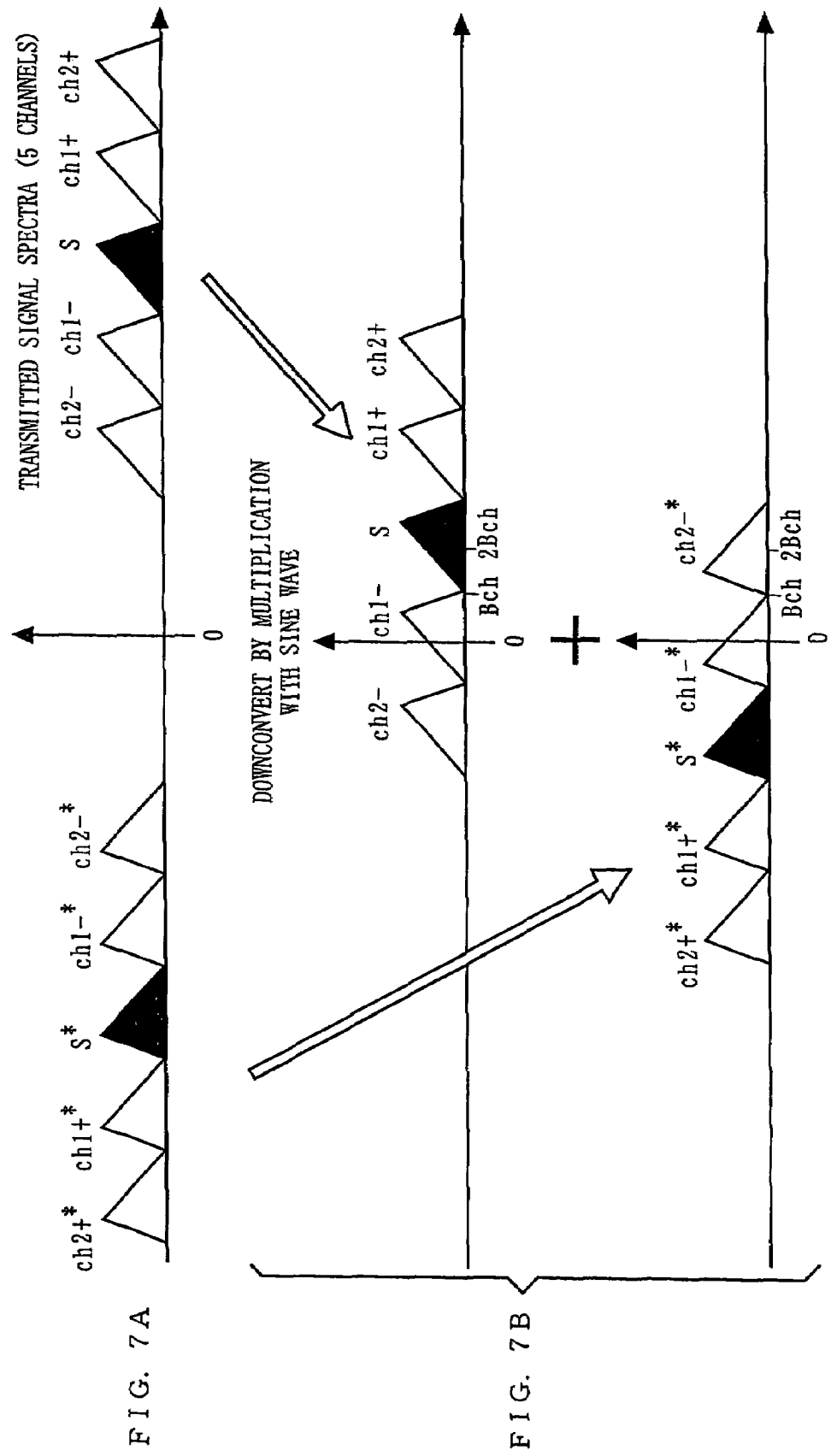

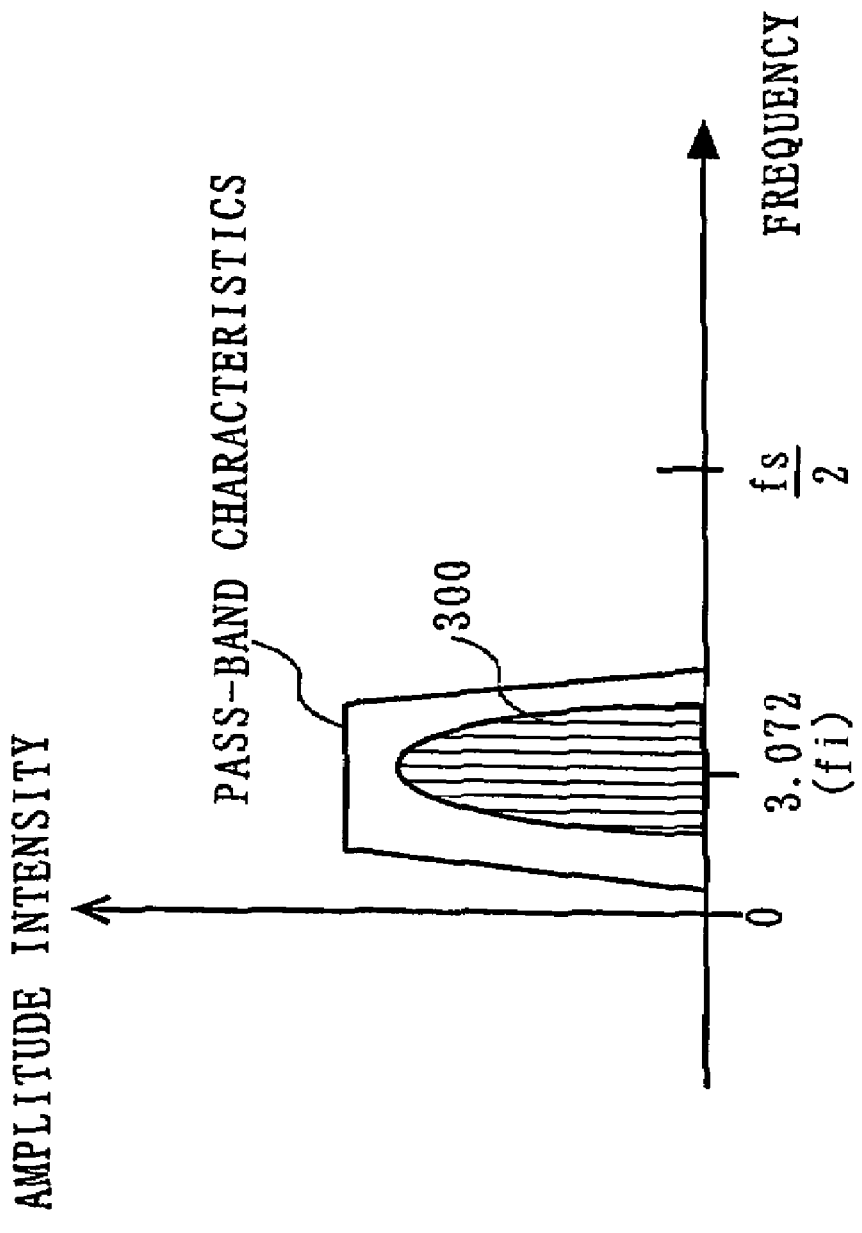

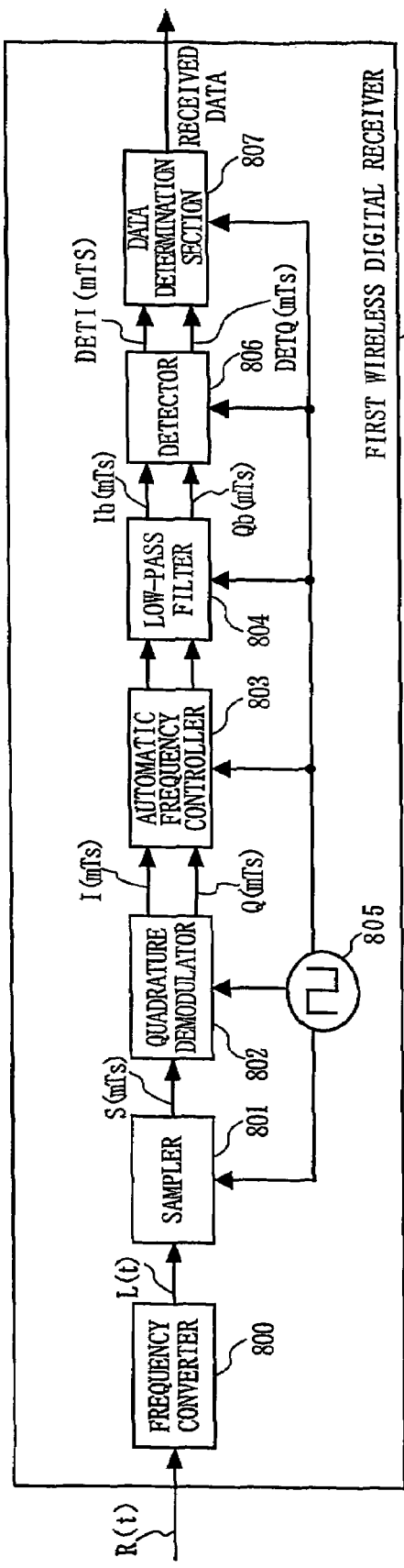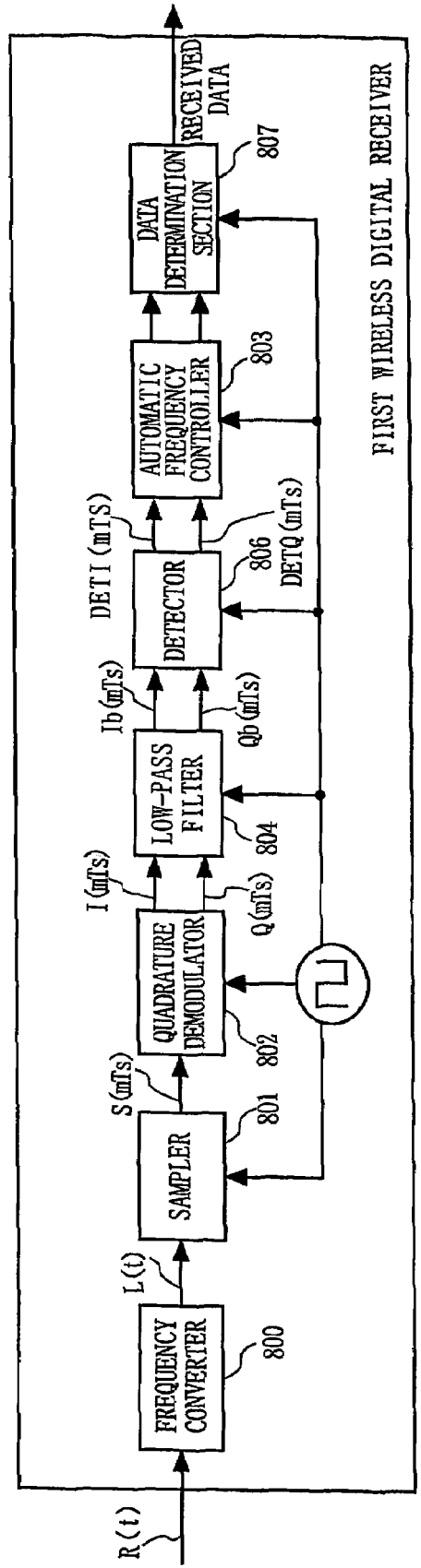

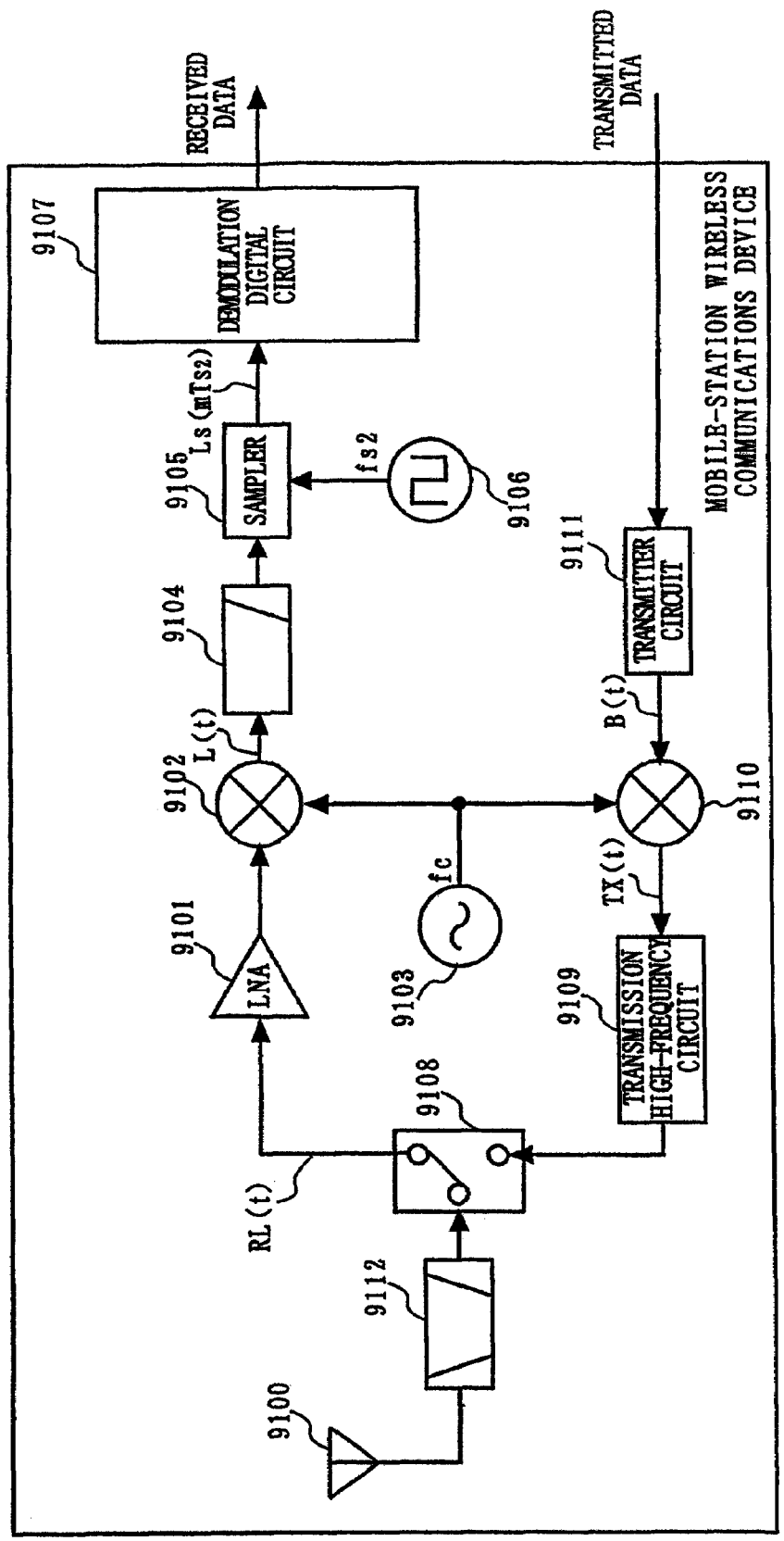
F I G. 2 2  Prior Art

WIRELESS COMMUNICATIONS SYSTEM AND WIRELESS DIGITAL RECEIVER FOR USE THEREIN

TECHNICAL FIELD

The present invention relates to a wireless communications system and a wireless digital receiver for use therein, and more particularly to a wireless communications system using an FDD (Frequency Division Duplex) architecture and a wireless digital receiver for use therein.

BACKGROUND ART

One of the conventional wireless communications systems using the FDD architecture is a wireless communications system using a DSRC (Dedicated Short Range Communications) architecture (hereinafter referred to as a "DSRC system").

The DSRC system standard specifies that when transmitting a first wireless signal from a first wireless communications device provided on the road (hereinafter referred to as a "base station") to a second wireless communications device provided in a vehicle (hereinafter referred to as a "mobile station") (hereinafter such a transmission will be referred to as a "downlink"), one of 5775 [MHz], 5780 [MHz], 5785 [MHz], 5790 [MHz], 5795 [MHz], 5800 [MHz] and 5805 [MHz] is used as the center frequency.

The DSRC system standard also specifies that when transmitting a second wireless signal from the mobile station to the base station (hereinafter such a transmission will be referred to as an "uplink"), a center frequency that is away from that used for the downlink by 40.000 [MHz] is used. Specifically, if 5775 [MHz] is used as the center frequency for the downlink, 5815 [MHz] is used as the center frequency for the uplink. Similarly, if 5780 [MHz] is used for the downlink, 5820 [MHz] is used for the uplink. If 5785 [MHz] is used for the downlink, 5825 [MHz] is used for the uplink. If 5790 [MHz] is used for the downlink, 5830 [MHz] is used for the up link. If 5795 [MHz] is used for the downlink, 5835 [MHz] is used for the uplink. If 5800 [MHz] is used for the downlink, 5840 [MHz] is used for the uplink. If 5805 [MHz] is used for the downlink, 5845 [MHz] is used for the uplink.

In a section on the technical requirements for wireless equipment in DSRC system standard specifications, standards for image response are specified only for the base station.

Where a demodulation process is performed by a digital signal processing circuit, in order to convert a received modulated high-frequency signal to a frequency suitable for the digital signal processing circuit, a frequency conversion circuit for downconverting the modulated high-frequency signal needs to be provided preceding the digital signal processing circuit.

In view of the technical requirements for wireless equipment, it is preferred that a frequency conversion circuit employing a LOW-IF architecture, for example, is used in the base station. This is because it is possible with the LOW-IF architecture to remove an image disturbing signal without using an image suppression filter in a high-frequency part, as described in Non-Patent Document 1 (J. Crols and Michiel S. J. Steyaert, "Low-IF Topologies for High-Performance Analog Front Ends of Fully Integrated Receivers", IEEE TRANSACTIONS ON CIRCUITS AND SYSTEMS II: ANALOG AND DIGITAL SIGNAL PROCESSING, VOL. 45, NO. 3, March 1998).

As described in Non-Patent Document 1, with the LOW-IF architecture, the center frequency of a received modulated high-frequency signal is downconverted to a frequency that is about a few times as great as the signal bandwidth of the modulated high-frequency signal. Then, the downconverted signal is directly sampled by a sampler and demodulated by a digital signal processing circuit. The LOW-IF architecture is advantageous in that it offers better reception characteristics and high degrees of integration.

For the mobile station, however, no image response standard is specified. Therefore, it is possible to use a frequency converter in which a local oscillator is shared by the transmitter and the receiver. Thus, with the mobile station, a single-conversion architecture can be employed. Therefore, the mobile station can be provided at a low cost.

As described above, where a frequency converter employing the LOW-IF architecture is used in the base station, a frequency-converted signal is converted into a signal having a frequency that is about a few times as great as the signal bandwidth of the received modulated high-frequency signal.

Where the mobile station uses a frequency converter employing the single-conversion architecture in which a local oscillator is shared by the transmitter and the receiver, a frequency-converted signal is converted into a signal having a frequency that is equal to the difference between the uplink and the downlink. Typically, the frequencies are different from each other. This is illustrated in FIG. 20 to FIG. 22.

FIG. 20 is a diagram schematically showing a conventional base station 9000 and a conventional mobile station 9001 communicating with each using the DSRC system. In FIG. 20, a frequency fc denotes the center frequency for the uplink, and the value thereof is one of 5815 [MHz], 5820 [MHz], 5825 [MHz], 5830 [MHz], 5835 [MHz], 5840 [MHz] and 5845 [MHz]. Moreover, in FIG. 20, a frequency fd denotes the difference between the center frequency of the signal used for the uplink and that of the signal used for the downlink, and the value thereof is 40.000 [MHz]. As shown in FIG. 20, a signal is uplinked from the mobile station 9001 to the base station 9000 with the center frequency fc. A signal is downlinked from the base station 9000 to the mobile station 9001 with a center frequency fc–fd. In the DSRC system, it is specified that the channel bandwidth is 5 [MHz].

FIG. 21 is a diagram showing a general configuration of a conventional base-station wireless communications device employing the LOW-IF architecture. FIG. 22 is a diagram showing a general configuration of a conventional mobile-station wireless communications device employing the single-conversion architecture. For the purpose of simplifying the problem, the following description will only discuss the signal-receiving operation at the mobile-station wireless communications device and the base-station wireless communications device.

First, referring to FIG. 20 and FIG. 21, the signal-receiving operation at the base-station wireless communications device will be described. In FIG. 21, the base-station wireless communications device includes an antenna 9200, a band-pass filter 9216, a transmission/reception selector switch 9211, an amplifier 9201, a first mixer 9202, a second mixer 9203, a first local oscillator 9206, a first low-pass filter 9204, a second low-pass filter 9205, a first sampler 9207, a second sampler 9208, a sampling signal generator 9209, a demodulation digital circuit 9210, a transmission high-frequency circuit 9212, a third mixer 9213, a second local oscillator 9214 and a transmitter circuit 9215.

In the base-station wireless communications device, the signal-receiving operation is performed by using the antenna 9200, the band-pass filter 9216, the transmission/reception selector switch 9211, the amplifier 9201, the first mixer 9202, the second mixer 9203, the first local oscillator 9206, the first low-pass filter 9204, the second low-pass filter 9205, the first sampler 9207, the second sampler 9208, the sampling signal generator 9209 and the demodulation digital circuit 9210.

In the signal-receiving operation, the transmission/reception selector switch 9211 is switched so that the antenna 9200 and the amplifier 9201 are connected to each other. A modulated high-frequency signal R(t) from the mobile station 9001 received by the antenna 9200 whose center frequency is fc is inputted to the amplifier 9201. The amplifier 9201 amplifies the modulated high-frequency signal R(t) to an appropriate level, and inputs the amplified signal to the first mixer 9202 and the second mixer 9203. The first local oscillator 9206 outputs a sine wave whose center frequency is fc−fa. As described in Non-Patent Document 1, it is preferred that fa is a frequency that is about a few times as great as the channel bandwidth of the modulated high-frequency signal R(t).

The first mixer 9202 multiplies the sine wave outputted from the first local oscillator 9206 whose center frequency is fc−fa with the modulated high frequency signal R(t) to output a modulated low-to-intermediate-frequency signal in-phase component RXI(t) whose center frequency is fa.

The second mixer 9203 multiplies a signal outputted from the first local oscillator 9206 whose center frequency is fc−fa and whose phase is shifted from that of the sine wave by $\pi/2$ with the modulated high-frequency signal R(t) to output a modulated low-to-intermediate-frequency signal quadrature component RXQ(t) whose center frequency is fa.

The first sampler 9207 samples the modulated low-to-intermediate-frequency signal in-phase component RXI(t) in synchronism with a signal outputted from the sampling signal generator 9209 whose frequency is fs1 to output an in-phase component sampled signal I(mTs1).

The second sampler 9208 samples the modulated low-to-intermediate-frequency signal quadrature component RXQ (t) in synchronism with a signal outputted from the sampling signal generator 9209 whose frequency is fs1 to output a quadrature component sampled signal Q(mTs1).

Herein, m is an integer, and Ts1 is the inverse of the sampling signal frequency fs1, .e., Ts1=1/fs1. In order to facilitate the signal processing operation at the demodulation digital circuit 9210, fs1 is in many cases set to a value that is equal to fa multiplied by $2^N$ (N is a natural number: N=1, 2, 3, . . . ).

The demodulation digital circuit 9210 receives the in-phase component sampled signal I(mTs1) and the quadrature component sampled signal Q(mTs1) as input signals, and demodulates the signals to output received data after removing the image disturbing signal, as described in Non-Patent Document 1.

Next, referring to FIG. 21 and FIG. 22, the signal-receiving operation at the mobile-station wireless communications device will be described. In FIG. 22, the mobile-station wireless communications device includes an antenna 9100, a band-pass filter 9112, a transmission/reception selector switch 9108, an amplifier 9101, a first mixer 9102, a local oscillator 9103, a low-pass filter 9104, a sampler 9105, a sampling signal generator 9106, a demodulation digital circuit 9107, a transmission high-frequency circuit 9109, a second mixer 9110 and a transmitter circuit 9111.

In the mobile-station wireless communications device, the signal-receiving operation is performed by using the antenna 9100, the band-pass filter 9112, the transmission/reception selector switch 9108, the amplifier 9101, the first mixer 9102, the local oscillator 9103, the low-pass filter 9104, the sampler 9105, the sampling signal generator 9106 and the demodulation digital circuit 9107.

In the signal-receiving operation, the transmission/reception selector switch 9108 is switched so that the antenna 9100 and the amplifier 9101 are connected to each other. A modulated high-frequency signal RL(t) from the base station 9000 received by the antenna 9100 whose center frequency is fc−fd is first passed through the band pass filter 9112 to remove signals of frequency bands that are used neither in the base station nor in the mobile station, and is then inputted to the amplifier 9101. The amplifier 9101 amplifies the modulated high-frequency signal RL(t) to an appropriate level, and inputs the amplified signal to the first mixer 9102. The first local oscillator 9103 outputs a sine wave whose center frequency is fc.

The first mixer 9102 multiplies the sine wave outputted from the local oscillator 9103 whose center frequency is fc with the modulated high-frequency signal RL(t) to output a modulated low-to-intermediate-frequency signal L(t) whose center frequency is fd to the low-pass filter 9104.

In the frequency conversion at the first mixer 9102, a signal whose center frequency is fc+fd is an image disturbing signal. However, since the image response is not specified in the technical requirements for wireless equipment used in the mobile station in the DSRC system standard, a lower-order, inexpensive low-pass filter can be used as the filter following the first mixer 9102. If the image disturbing signal were to be a problem, signal components of only the necessary bands can be extracted by using a complex filter.

The sampler 9105 samples the modulated low-to-intermediate-frequency signal L(t) outputted from the low-pass filter 9104 whose center frequency is fd in synchronism with a signal outputted from the sampling signal generator 9106 whose frequency is fs2 output a sampled signal Ls(mTs2). Herein, m is an integer, and Ts2 is a value represented by the inverse (1/fs2) of the sampling signal frequency fs2. In order to facilitate the signal processing operation at the demodulation digital circuit 9107, fs2 is in many cases set to a value that is equal to fd multiplied by $2^N$ (N is a natural number: N=1, 2, 3, . . . ).

The demodulation digital circuit 9107 receives the sampled signal Ls(mTs2) as an input signal, and demodulates the signal to output received data.

Other background art publications related to the present invention include Non-Patent Document 2 (Mikko Valkama, et al., "Advanced Methods for I/Q Imbalance Compensation in Communication Receivers" IEEE TRANSACTIONS ON SIGNAL PROCESSING, Vol. 49, No. 10, pp. 2335-2344, October 2001) and Non-Patent Document 3 (Kiyomichi Araki ed., "Software Musen No Kiso To Oyo (Basics and Applications of Software Radio)", SIPEC Corporation Knowledge Service Department, p. 123, October 2002).

As described above, in the base station employing the LOW-IF architecture, the center frequency fa of the signals RXI(t) and RXQ(t) inputted to the first and second samplers 9207 and 9208 is about a few times as great as the signal bandwidth of the modulated high-frequency signal R(t). In the mobile station employing the single-conversion architecture, the center frequency fd of the signal L(t) inputted to the sampler 9105 is equal to the difference (40.000 [MHz]) between the uplink frequency and the downlink frequency as specified in the DSRC system standard.

Therefore, the center frequency of the signal inputted to the sampler in the mobile station is substantially different from that of the signal inputted to the sampler in the base station, whereby the frequency of the sampling signal used in the sampler 9105 in the mobile station is different from that of the sampling signal used in the first and second samplers 9207 and 9208 in the base station.

Therefore, with the conventional system, the sampling frequency for the base station and that for the mobile station need to be set to different values even though their demodulation digital circuits are substantially the same in function. Thus, it is necessary to provide two different demodulation digital circuits for the base station and for the mobile station. Although it is desirable to realize a common demodulation digital circuit for the base station and for the mobile station in order to provide an inexpensive transceiver, it is difficult to realize such a common demodulation digital circuit for reasons stated above.

DISCLOSURE OF THE INVENTION

Therefore, an object of the present invention is to realize a wireless communications system in which a common sampling frequency is used by the base station and the mobile station, thereby providing wireless digital receivers for the base station and for the mobile station at a low cost and reducing the overall cost of the wireless communications system.

The present invention has the following features to attain the object mentioned above.

A first aspect of the present invention is directed to a wireless communications system for transmitting/receiving a first wireless signal from a first wireless communications device and a second wireless signal from a second wireless communications device, the first and second wireless signals having different frequency bands from each other, wherein: the first wireless communications device includes: a first frequency converter operable to downconvert the second wireless signal transmitted from the second wireless communications device to a first low-frequency signal; a first sampler operable to oversample the first low-frequency signal downconverted by the first frequency converter; and a first demodulation digital circuit operable to demodulate the signal oversampled by the first sampler; the signal demodulated by the first demodulation digital circuit has a center frequency of fi [Hz]; the second wireless communications device includes: a second frequency converter operable to downconvert the first wireless signal transmitted from the first wireless communications device to a second low-frequency signal whose center frequency fd [Hz] is equal to a difference between a center frequency of the first wireless signal and that of the second wireless signal; a second sampler operable to undersample the second low-frequency signal downconverted by the second frequency converter; and a second demodulation digital circuit operable to demodulate the signal undersampled by the second sampler; a sampling frequency used in the first sampler and that used in the second sampler are the same sampling frequency fs [Hz]; the sampling frequency fs [Hz] is set to a value that is an even-number multiple of a wireless symbol transmission rate such that oversampling is done in the first sampler and undersampling is done in the second sampler; and the center frequency fi [Hz] is ½ to 1 times a frequency corresponding to a bandwidth of the first and second wireless signals and is $1/2^N$ (N is a natural number) times the sampling frequency fs [Hz].

In a preferred embodiment, where the bandwidth of the first and second wireless signals is 2×Bch [Hz] and the wireless symbol transmission rate is fsym [Hz], the sampling frequency fs [Hz] and the center frequency fi [Hz] are expressed as shown in the following expressions:

$$fi = \frac{2k fsym}{2^N}$$

$$fs = 2^N fi$$

where k is an integer satisfying $$\frac{fd + Bch}{(n+1) fsym} \leq k \leq \frac{fd - Bch}{n fsym} \qquad \text{Exp. 12}$$

and $$k \leq \frac{fd}{2 fsym} \qquad \text{Exp. 14}$$

and N is an integer satisfying $$\log 2\left\{\frac{fd + bch}{(n+1)Bch}\right\} \leq N \leq \log 2\left\{\frac{2(fd - Bch)}{nBch}\right\} \qquad \text{Exp. 22}$$

where n is an integer satisfying $$1 \leq n \leq \frac{fd - Bch}{2Bch}. \qquad \text{Exp. 7}$$

In a preferred embodiment, the first frequency converter downconverts the second wireless signal transmitted from the second wireless communications device to a first low-frequency signal whose center frequency is fj [Hz]; and the first low-frequency signal is demodulated by the first demodulation digital circuit after being corrected to a signal whose center frequency is fi [Hz] at a position preceding or following the first sampler.

In a preferred embodiment, the center frequency fd is 40.000 [MHz]; and the frequency fi and the sampling frequency fs are fi=3.072 [MHz] and fs=24.576 [MHz], fi=3.072 [MHz] and fs=12.288 [MHz], fi=4.608 [MHz] and fs=36.864 [MHz], fi=4.096 [MHz] and fs=32.768 [MHz], or fi=3.584 [MHz] and fs=28.672 [MHz].

In a preferred embodiment, the first demodulation digital circuit includes: a first quadrature demodulator operable to quadrature-demodulate the signal over sampled by the first sampler; a first low-pass filter operable to low-pass-filter the signal quadrature demodulated by the first quadrature demodulator; and a first received data reproducing section operable to reproduce received data from the signal low-pass-filtered by the first low-pass filter; the second demodulation digital circuit includes: a second quadrature demodulator operable to quadrature-demodulate the signal undersampled by the second sampler; a second low-pass filter operable to low-pass-filter the signal quadrature-demodulated by the second quadrature demodulator; and a second received data reproducing section operable to reproduce received data from the signal low-pass-filtered by the second low-pass filter; the first quadrature demodulator converts the signal oversampled by the first sampler to a signal including a component whose center frequency is zero; and the second quadrature demodulator converts the signal undersampled by the second sampler to a signal including a component whose center frequency is zero.

In a preferred embodiment, the first demodulation digital circuit includes: a first complex filter operable to filter, by using a digital filter, either one of a positive frequency component and a negative frequency component of the signal oversampled by the first sampler whose center frequency is closer to zero; and a first received data reproducing section operable to reproduce received data from the signal filtered by the first complex filter; and the second demodulation digital circuit includes: a second complex filter operable to filter, by using a digital filter, either one of a positive frequency component and a negative frequency component of the signal under sampled by the second sampler whose center frequency is closer to zero; and a second received data reproducing section operable to reproduce received data from the signal filtered by the second complex filter.

In a preferred embodiment, the first demodulation digital circuit includes: a first quadrature demodulator operable to quadrature-demodulate the signal over sampled by the first sampler; a first low-pass filter operable to low-pass-filter the signal outputted from the first quadrature demodulator; and a first received data reproducing section operable to reproduce received data from the signal low-pass-filtered by the first low-pass filter; the second demodulation digital circuit includes: a second quadrature demodulator operable to quadrature-demodulate the signal under sampled by the second sampler; a second low-pass filter operable to low-pass-filter the signal quadrature-demodulated by the second quadrature demodulator; and a second received data reproducing section operable to reproduce received data from the signal low-pass-filtered by the second low-pass filter; the first quadrature demodulator converts the signal oversampled by the first sampler to a signal including a component whose center frequency is zero; and the second quadrature demodulator converts the signal undersampled by the second sampler to a signal including a component whose center frequency is zero.

In a preferred embodiment, the frequency fj [Hz] is 3.000 [MHz].

A second aspect of the present invention is directed to a wireless digital receiver in a wireless communications system for transmitting/receiving a first wireless signal from a first wireless communications device and a second wireless signal from a second wireless communications device, the first and second wireless signal shaving different frequency bands from each other, the wireless digital receiver receiving the second wireless signal in the first wireless communications device and digitally demodulating the second wireless signal, the wireless digital receiver including: a frequency converter operable to downconvert the second wireless signal transmitted from the second wireless communications device to a low-frequency signal whose center frequency is fi [Hz]; a sampler operable to oversample the low-frequency signal downconverted by the frequency converter; and a demodulation digital circuit operable to demodulate the signal oversampled by the sampler, wherein: a sampling frequency used in the sampler and that used in the second wireless communications device are the same sampling frequency fs [Hz]; the sampling frequency fs [Hz] is set to a value that is an even-number multiple of a wireless symbol transmission rate such that oversampling is done in the sampler and undersampling is done in a sampler of the second wireless communications device; and the center frequency fi [Hz] of the low-frequency signal is ½ to 1 times a frequency corresponding to a bandwidth of the first and second wireless signals and is $\frac{1}{2^N}$ (N is a natural number) times the sampling frequency fs [Hz].

In a preferred embodiment, where the bandwidth of the first and second wireless signals is 2×Bch [Hz] and the wireless symbol transmission rate is fsym [Hz], the sampling frequency fs [Hz] and the center frequency fi [Hz] of the low-frequency signal are expressed as shown in the following expressions:

$$fi = \frac{2kfsym}{2^N}$$

$$fs = 2^N fi$$

where k is an integer satisfying $$\frac{fd + Bch}{(n+1)fsym} \le k \le \frac{fd - Bch}{nfsym} \qquad \text{Exp. 12}$$

and $$k \le \frac{fd}{2fsym} \qquad \text{Exp. 14}$$

and N is an integer satisfying $$\log 2\left\{\frac{fd + bch}{(n+1)Bch}\right\} \le N \le \log 2\left\{\frac{2(fd - Bch)}{nBch}\right\} \qquad \text{Exp. 22}$$

where n is an integer satisfying $$1 \le n \le \frac{fd - Bch}{2Bch}. \qquad \text{Exp. 7}$$

In a preferred embodiment, the center frequency fi and the sampling frequency fs are fi=3.072 [MHz] and fs=24.576 [MHz], fi=3.072 [MHz] and fs=12.288 [MHz], fi=4.608 [MHz] and fs=36.864 [MHz], fi=4.096 [MHz] and fs=32.768 [MHz], or fi=3.584 [MHz] and fs=28.672 [MHz].

In a preferred embodiment, the demodulation digital circuit includes: a quadrature demodulator operable to quadrature-demodulate the signal oversampled by the sampler; a low-pass filter operable to low-pass-filter the signal quadrature-demodulated by the quadrature demodulator; and a received data reproducing section operable to reproduce received data from the signal low-pass-filtered by the low-pass filter; and the quadrature demodulator converts the signal oversampled by the sampler to a signal including a component whose center frequency is zero.

In a preferred embodiment, the demodulation digital circuit includes: a complex filter operable to filter, by using a digital filter, either one of a positive frequency component and a negative frequency component of the signal oversampled by the sampler whose center frequency is closer to zero; and a received data reproducing section operable to reproduce received data from the signal filtered by the complex filter.

A third aspect of the present invention is directed to a wireless digital receiver in a wireless communications system for transmitting/receiving a first wireless signal from a first wireless communications device and a second wireless signal from a second wireless communications device, the first and second wireless signals having different frequency bands from each other, the wireless digital receiver receiving the first wireless signal in the second wireless communications device and digitally demodulating the first wireless signal, the wireless digital receiver including: a frequency converter operable to downconvert the first wireless signal transmitted from the first wireless communications device to a low-frequency signal whose center frequency fd [Hz] is equal to a difference between a center frequency of the first wireless signal and that of the second wireless signal; a sampler operable to undersample the low-frequency signal downconverted by the frequency converter; and a demodulation digital circuit operable to demodulate the signal undersampled by the sampler, wherein: a sampling frequency used in the sampler and that used in the first wireless communications device are the same sampling frequency fs [Hz]; and the sampling frequency fs [Hz] is set to a value that is an even-number multiple of a wireless symbol transmission rate such that undersampling is done in the sampler and oversampling is done in a sampler of the first wireless communications device.

In a preferred embodiment, where the bandwidth of the first and second wireless signals is 2×Bch [Hz] and the wireless symbol transmission rate is fsym [Hz], the sampling frequency fs [Hz] is expressed as shown in the following expression:

$$fs = 2kfsym$$

where k is an integer satisfying $$\frac{fd + Bch}{(n+1)fsym} \leq k \leq \frac{fd - Bch}{nfsym} \qquad \text{Exp. 12}$$

and $$k \leq \frac{fd}{2fsym} \qquad \text{Exp. 14}$$

where n is an integer satisfying $$1 \leq n \leq \frac{fd - Bch}{2Bch}. \qquad \text{Exp. 7}$$

In a preferred embodiment, the center frequency fd is 40.000 [MHz]; and the sampling frequency fs is 24.576 [MHz], 12.288 [MHz], fs=36.864 [MHz], fs=32.768 [MHz] or fs=28.672 [MHz].

In a preferred embodiment, the demodulation digital circuit includes: a quadrature demodulator operable to quadrature-demodulate the signal undersampled by the sampler; and a low-pass filter operable to low-pass-filter the signal quadrature-demodulated by the quadrature demodulator; and a received data reproducing section operable to reproduce received data from the signal low-pass-filtered by the low-pass filter; and the quadrature demodulator converts the signal undersampled by the sampler to a signal including a component whose center frequency is zero.

In a preferred embodiment, the demodulation digital circuit includes: a complex filter operable to filter, by using a digital filter, either one of a positive frequency component and a negative frequency component of the signal under sampled by the sampler whose center frequency is closer to zero; and a received data reproducing section operable to reproduce received data from the signal filtered by the complex filter.

A fourth aspect of the present invention is directed to a wireless digital receiver in a wireless communications system for transmitting/receiving a first wireless signal from a first wireless communications device and a second wireless signal from a second wireless communications device, the first and second wireless signals having different frequency bands from each other, the wireless digital receiver receiving the second wireless signal in the first wireless communications device and digitally demodulating the second wireless signal, the wireless digital receiver including: a frequency converter operable to downconvert the second wireless signal transmitted from the second wireless communications device to a low-frequency signal whose center frequency is fj [Hz]; a sampler operable to oversample the low-frequency signal downconverted by the frequency converter; and a demodulation digital circuit operable to demodulate the signal oversampled by the sampler after correcting a center frequency thereof to fi [Hz], wherein: a sampling frequency used in the sampler and that used in the second wireless communications device are the same sampling frequency fs [Hz]; the sampling frequency fs [Hz] is set to a value that is an even-number multiple of a wireless symbol transmission rate such that oversampling is done in the sampler and undersampling is done in a sampler of the second wireless communications device; and the center frequency fi [Hz] is ½ to 1 times a frequency corresponding to a bandwidth of the first and second wireless signals and is $1/2^N$ (N is a natural number) times the sampling frequency fs [Hz].

In a preferred embodiment, where the bandwidth of the first and second wireless signals is 2×Bch [Hz] and the wireless symbol transmission rate is fsym [Hz], the sampling frequency fs [Hz] and the frequency fi [Hz] are expressed as shown in the following expressions:

$$fi = \frac{2kfsym}{2^N}$$

$$fs = 2^N fi$$

where k is an integer satisfying $$\frac{fd + Bch}{(n+1)fsym} \leq k \leq \frac{fd - Bch}{nfsym} \qquad \text{Exp. 12}$$

and $$k \leq \frac{fd}{2fsym} \qquad \text{Exp. 14}$$

and N is an integer satisfying $$\log 2\left\{\frac{fd + Bch}{(n+1)Bch}\right\} \leq N \leq \log 2\left\{\frac{2(fd - Bch)}{nBch}\right\} \qquad \text{Exp. 22}$$

where n is an integer satisfying $$1 \leq n \leq \frac{fd - Bch}{2Bch}. \qquad \text{Exp. 7}$$

In a preferred embodiment, the demodulation digital circuit includes: a quadrature demodulator operable to quadrature-demodulate the signal oversampled by the sampler; an automatic frequency controller operable to correct the signal quadrature-demodulated by the quadrature demodulator to a signal having a component whose frequency is fi [Hz]; a low-pass filter operable to low-pass-filter the signal frequency-corrected by the automatic frequency controller; and a received data reproducing section operable to reproduce received data from the signal low-pass-filtered by the low-pass filter.

In a preferred embodiment, the frequency fj [Hz] is 3.000 [MHz].

Each functional block of the present invention is preferably implemented in the form of an integrated circuit. The integrated circuits implementing these functional blocks may be individually formed into a separate chip, or some or all of them may be formed together into a single chip. In the present specification, "an integrated circuit" refers not only to an integrated circuit provided in the form of a single chip, but also to a group of integrated circuits that are formed together into a single chip.

The effects of the present invention will now be described. In a wireless communications system of the present invention and a wireless digital receiver for use therein, the sampling frequency used in the first wireless communications device (base station) is the same as that used in the second wireless communications device (mobile station). Therefore, the same demodulation digital circuit for performing a digital demodulation operation can be used for the first and second wireless communications devices. Therefore, with the present invention, it is not necessary to provide a separate demodulation digital circuit for the first and second wireless communications devices (the base station and the mobile station), whereby it is possible to provide an inexpensive wireless digital receiver, thereby reducing the overall cost of the wireless communications system.

Moreover, with the provision of the automatic frequency controller in the demodulation digital circuit, the local oscillator is allowed a certain degree of freedom, which also contributes to reducing the cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6A and FIG. 6B are diagrams showing the spectrum of a transmitted signal, and the result of a multiplication of the transmitted signal with a sine wave;

FIG. 7A and FIG. 7B are diagrams showing the spectrum of a transmitted signal, and the result of a multiplication of the transmitted signal with a sine wave;

FIG. 14 is a diagram showing exemplary pass-band characteristics of a complex filter 602;

FIG. 16A and FIG. 16B are block diagrams each showing a functional configuration of the first wireless digital receiver 21 according to a third embodiment of the present invention;

FIG. 22 is a diagram showing a general configuration of a conventional mobile-station wireless communications device employing the single-conversion architecture.

BEST MODE FOR CARRYING OUT THE INVENTION

First Embodiment

Figure 1:
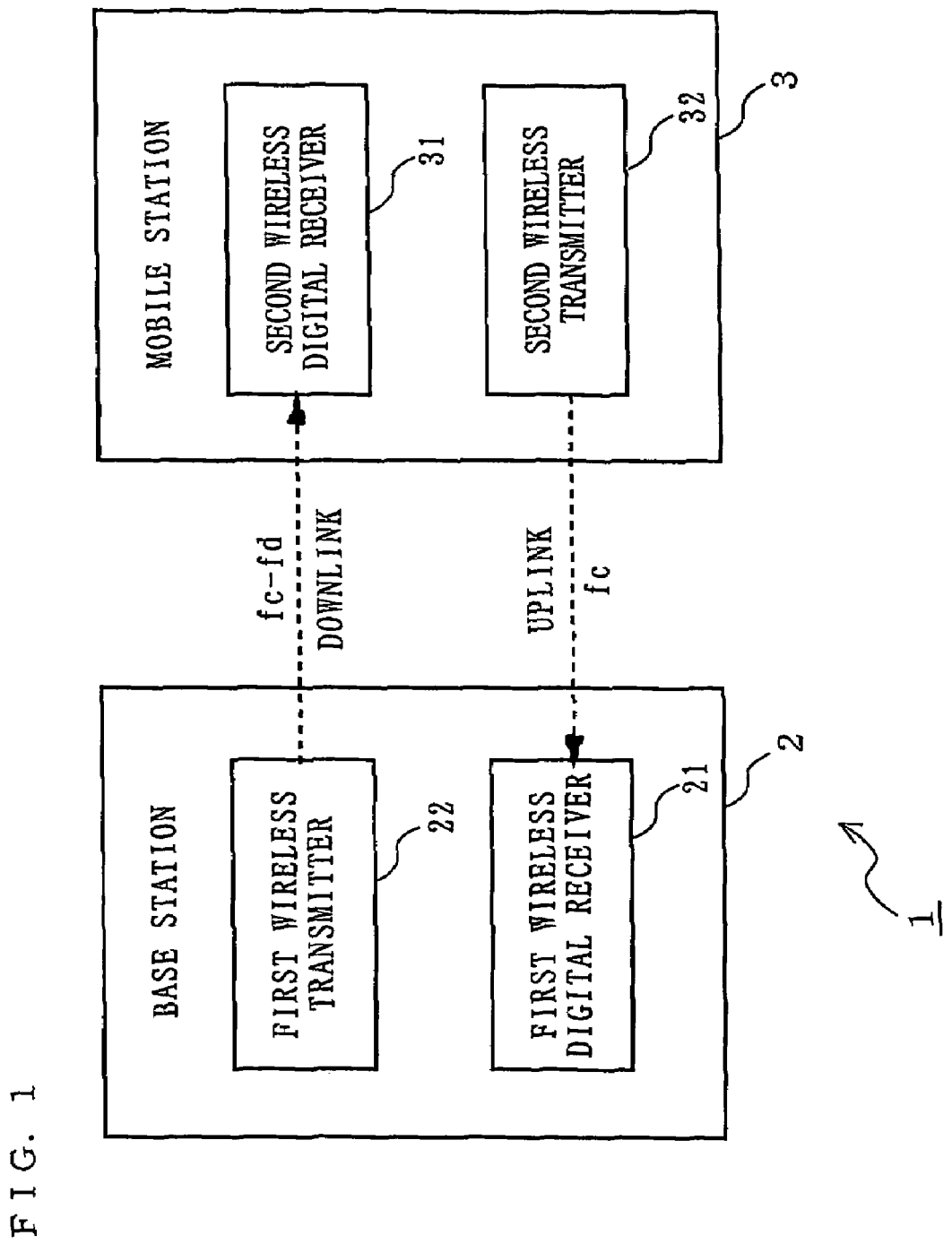
FIG. 1 is a block diagram showing a functional configuration of a wireless communications system 1 according to a first embodiment of the present invention.

FIG. 1 is a block diagram showing a functional configuration of a wireless communications system 1 according to a first embodiment of the present invention. In FIG. 1, the wireless communications system 1 includes a base station 2 being a first wireless communications device, and a mobile station 3 being a second wireless communications device. The base station 2 includes a first wireless digital receiver 21 and a first wireless transmitter 22. The mobile station 3 includes a second wireless digital receiver 31 and a second wireless transmitter 32. FIG. 1 only shows one base station 2 and one mobile station 3 for the sake of simplicity. In practice, however, there are a plurality of base stations 2 and a plurality of mobile stations 3 communicating with one another using different channels.

The wireless communications system 1 employs the DSRC system standard. Therefore, one of 5815 [MHz], 5820 [MHz], 5825 [MHz], 5830 [MHz], 5835 [MHz], 5840 [MHz] and 5845 [MHz], is used for the uplink from the mobile station 3 to the base station 2. Herein, the center frequency of a signal used for the uplink is denoted as fc [Hz] (hereinafter referred to simply as "fc").

For the downlink from the base station 2 to the mobile station 3, one of 5775 [MHz], 5780 [MHz], 5785 [MHz], 5790 [MHz], 5795 [MHz], 5800 [MHz] and 5805 [MHz] is used according to the frequency fc for the uplink. The frequency fd [Hz] (hereinafter referred to simply as "fd"), which is equal to the difference between the frequency used for the downlink and that used for the uplink, is always 40.000 [MHz]. The center frequency of a signal used for the downlink is fc−fd [Hz] (hereinafter referred to simply as "fc−fd").

The DSRC system standard specifications include a section on the technical requirements for wireless equipment, which specifies various requirements for the base station and the mobile station.

The DSRC system standard specifies that the bandwidth of a signal in each channel (hereinafter referred to as the "channel bandwidth") is 5 [MHz]. According to this specification, it is understood that where the channel bandwidth is denoted as 2×Bch, Bch=2.5 [MHz].

In the DSRC system, it is specified that the modulation scheme employed needs to be either the ASK (Amplitude Shift Keying) scheme in which the wireless symbol frequency fsym [Hz] (hereinafter referred to simply as "fsym") is 1.024 [MHz] or the π/4 shift QPSK (Quadrature Phase Shift Keying) in which the wireless symbol frequency fsym is 2.048 [MHz]. The DSRC system of the present embodiment employs the π/4 shift QPSK scheme with the wireless symbol frequency fsym=2.048 [MHz]. In the case of the ASK scheme, since the Manchester coding is used, fsym=1.024 [MHz] converted to a baud rate is 2.048 [MHz], which is equal to that of the π/4 shift QPSK scheme. Therefore, the following description in principle applies to the ASK scheme.

The first wireless transmitter 22 of the base station 2 outputs a signal (first wireless signal) whose center frequency is fc−fd. In response, the second wireless digital receiver 31 of the mobile station 3 receives the signal (first wireless signal) whose center frequency is fc−fd. The second wireless digital receiver 31 downconverts the received signal (first wireless signal) whose center frequency is fc−fd to a signal whose center frequency is fd=40.000 [MHz]. The second wireless digital receiver 31 undersamples the signal whose center frequency is fd in synchronism with the sampling signal whose sampling frequency is fs=24.576 [MHz]. The second wireless digital receiver 31 demodulates the undersampled signal by using a digital circuit to obtain received data.

The second wireless transmitter 32 of the mobile station 3 outputs a signal (second wireless signal) whose center frequency is fc. In response, the first wireless digital receiver 21 of the base station 2 receives the signal second wireless signal) whose center frequency is fc. The first wireless digital receiver 21 downconverts the received signal (second wireless signal) whose center frequency is fc to a signal whose center frequency is fi=3.072 [MHz]. The first wireless digital receiver 21 oversamples the signal whose center frequency is fi in synchronism with the sampling signal whose sampling frequency is fs=24.576 [MHz]. The first wireless digital receiver 21 demodulates the oversampled signal by using a digital circuit to obtain received data.

Figure 2:
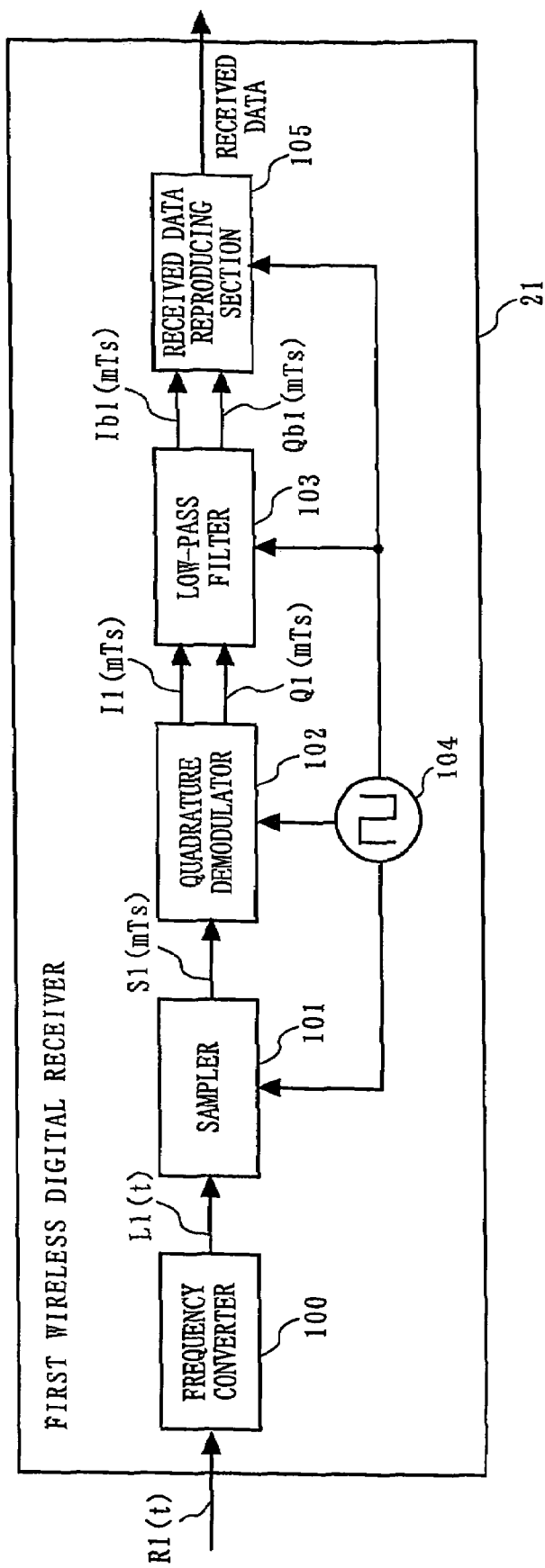
FIG. 2 is a block diagram showing a functional configuration of a first wireless digital receiver 21.

FIG. 2 is a block diagram showing a functional configuration of the first wireless digital receiver 21. In FIG. 2, the first wireless digital receiver 21 includes a frequency converter 100, a sampler 101, a quadrature demodulator 102, a low-pass filter 103, a sampling signal generator 104 and a received data reproducing section 105. The quadrature demodulator 102, the low-pass filter 103 and the received data reproducing section 105 will be hereinafter referred to collectively as a "first demodulation digital circuit". Assume that a modulated high-frequency signal R1($t$) whose center frequency is fc is inputted to the first wireless digital receiver 21.

The frequency converter 100 downconverts the modulated high-frequency signal R1($t$) and outputs the modulated low-frequency signal L1($t$) whose center frequency is fi=3.072 [MHz] The reason why the signal is downconverted to fi=3.072 [MHz] will later be described in detail.

The sampling signal generator 104 outputs a sampling signal whose sampling frequency is fs=24.576 [MHz]. The reason why the sampling frequency is fs=24.576 [MHz] will later be described in detail.

The sampler 101 oversamples the modulated low-frequency signal L1($t$) in synchronism with the sampling signal outputted from the sampling signal generator 104 to output a sampled signal S1($m$Ts). Herein, m is an integer (m=..., −1, 0, 1, ...), and Ts is the sampling period, i.e., Ts=1/fs.

The quadrature demodulator 102 performs an operation of multiplying the sampled signal S1($m$Ts) outputted from the sampler 101 by exp(−jθ×mTs) (where j is the imaginary unit) to output two signals whose phases are different from each other by π/2 [rad], i.e., an in-phase component sampled signal I1($m$Ts) and a quadrature component sampled signal Q1($m$Ts). Herein, θ is set to a value such that a signal that is frequency-shifted so that the center frequency thereof is zero is included in the signals outputted from the quadrature demodulator 102 after the multiplication with exp(−jθ×mTs). The value 8 will later be described in detail.

Figure 3:
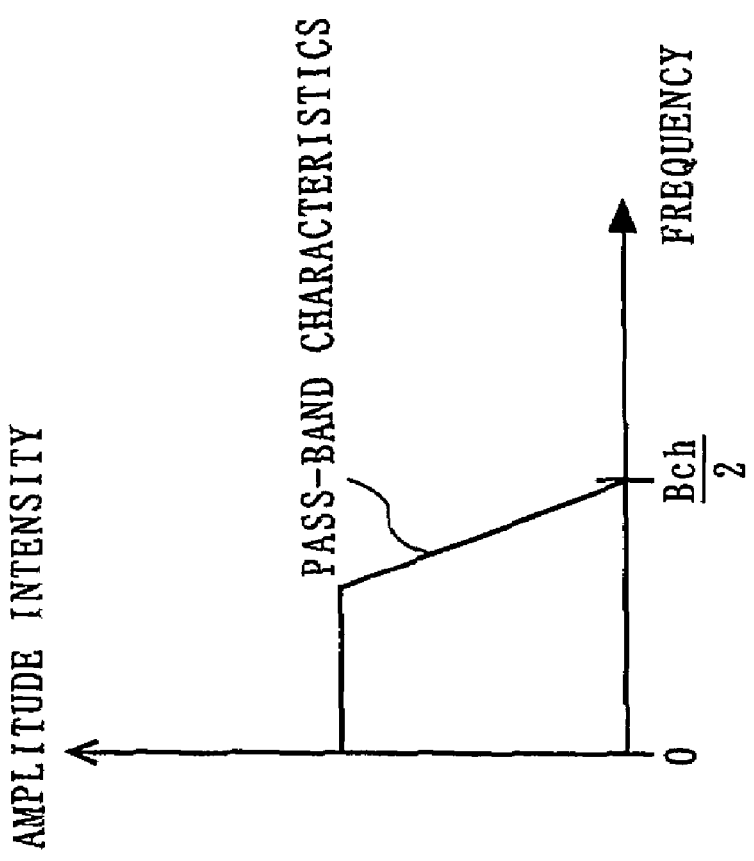
FIG. 3 is a diagram showing pass-band characteristics of a low-pass filter 103.

FIG. 3 is a diagram showing pass-band characteristics of the low-pass filter 103. A low-pass filter 203 is a digital filter whose frequency pass band is zero to Bch/2. With the provision of the low-pass filter 103, the in-phase component Ib1($m$Ts) and the quadrature component Qb1($m$Ts) of the baseband quadrature demodulated signal outputted from the low-pass filter 103 will only have a frequency component that is frequency shifted so that the center frequency thereof is zero.

The signals Ib1($m$Ts) and Qb1($m$Ts) outputted from the low-pass filter 103 only have a component that is frequency-shifted so that the center frequency thereof is zero, whereby the received data reproducing section 105 can output the received data by means of delay detection, or the like.

Figure 4:
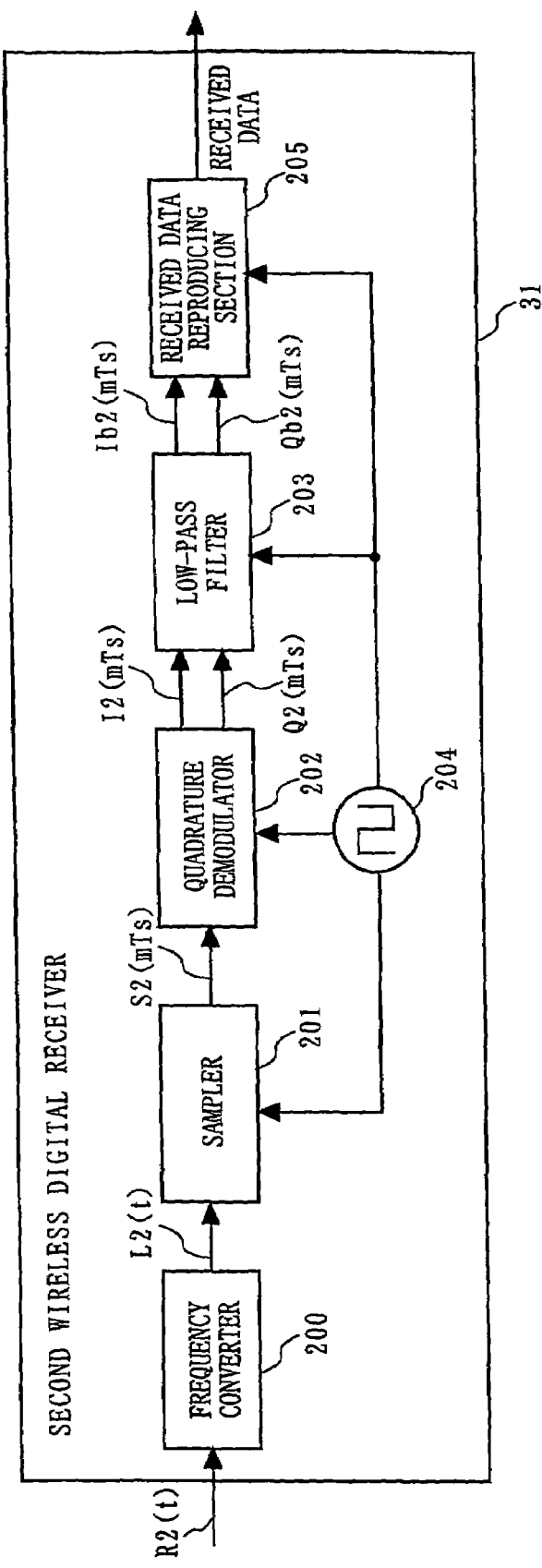
FIG. 4 is a block diagram showing a functional configuration of a second wireless digital receiver 31.

FIG. 4 is a block diagram showing a functional configuration of the second wireless digital receiver 31. In FIG. 4, the second wireless digital receiver 31 includes a frequency converter 200, a sampler 201, a quadrature demodulator 202, the low-pass filter 203, a sampling signal generator 204 and a received data reproducing section 205. The quadrature demodulator 202, the low-pass filter 203 and the received data reproducing section 205 will be hereinafter referred to collectively as a "second demodulation digital circuit". Assume that a modulated high-frequency signal R2($t$) whose center frequency is fc−fd is inputted to the second wireless digital receiver 31.

The frequency converter 200 downconverts the modulated high-frequency signal R2($t$) to output the modulated low-frequency signal L2($t$) whose center frequency is fd=40.000 [MHz]. In the mobile station of the DSRC system, a local oscillator signal whose frequency is fc is outputted from a local oscillator (not shown) in order to output a signal to be transmitted. The mobile station employs a single-conversion architecture using the local oscillator signal. Moreover, the frequency of the signal that the mobile station receives is fc−fd. Therefore, the frequency converter 200 downconverts the modulated high-frequency signal R2($t$) to fd=40.000 [MHz] by using the local oscillator signal whose frequency is fc.

The sampling signal generator 204 outputs a sampling signal whose sampling frequency is fs=24.576 [MHz]. Thus, the sampling signal generator 204 is the same as the sampling signal generator 104 in the first wireless digital receiver 21. As described above, in the present embodiment, the sampling frequency used in the first wireless digital receiver 21 is equal to that used in the second wireless digital receiver 31. The reason why the same sampling frequency can be used will later be described. Also, the reason why the sampling frequency is fs=24.576 [MHz] will later be described in detail.

The sampler 201 undersamples the modulated low-frequency signal L2(t) in synchronism with the sampling signal outputted from the sampling signal generator 204 to output a sampled signal S2(mTs). Herein, m is an integer (m=..., −1, 0, 1, ...), and Ts is the sampling period, i.e., Ts=1/fs.

The quadrature demodulator 202 performs an operation of multiplying the sampled signal S2(mTs) outputted from the sampler 201 by exp(−jη×xmTs) (where j is the imaginary unit) to output two signals whose phases are different from each other by π/2 [rad], i.e., an in-phase component sampled signal I2(mTs) and a quadrature component sampled signal Q2(mTs). Herein, η is set to a value such that a signal that is frequency-shifted so that the center frequency thereof is zero is included in the signals outputted from the quadrature demodulator 202 after the multiplication with exp(−jη×mTs). The value η will later be described in detail. As will be described later, η is a value different from θ used in the quadrature demodulator 202 of the first wireless digital receiver 21. Thus, the quadrature demodulator 102 used in the first wireless digital receiver 21 is the same as the quadrature demodulator 202 used in the second wireless digital receiver 31 except that the rotation angles θ and η used in the multiplication with exp are different from each other. The rotation angles being different from each other will later be described in detail.

The low-pass filter 203 is a digital filter whose frequency pass band is zero to Bch/2, as is the low-pass filter 103 in the first wireless digital receiver 21. Thus, FIG. 3 is relied upon also for the low-pass filter 203. With the provision of the low-pass filter 203, the in-phase component Ib2(mTs) and the quadrature component Qb2(mTs) of the baseband quadrature demodulated signal outputted from the low-pass filter 203 will only have a frequency component that is frequency-shifted so that the center frequency thereof is zero. The low-pass filter 103 used in the first wireless digital receiver 21 is the same as the low-pass filter 203 used in the second wireless digital receiver 31.

The signal Ib2(mTs) and Qb2(mTs) outputted from the low-pass filter 203 only have a component that is frequency-shifted so that the center frequency thereof is zero, whereby the received data reproducing section 205 can output the received data by means of delay detection, or the like.

Since the sampling frequency for the first wireless digital receiver 21 is equal to that for the second wireless digital receiver 31, the same sampling signal generator can be used as the sampling signal generators 104 and 204. Moreover, the same sampler can be used as the samplers 101 and 201. Furthermore, the same low-pass filter can be used as the low-pass filters 103 and 203. In addition, since it is only necessary to change the rotation angle between the quadrature demodulator 102 and the quadrature demodulator 202, the same quadrature demodulator can be used as the quadrature demodulator 102 in the first wireless digital receiver 21 and the quadrature demodulator 202 in the second wireless digital receiver 31 if two different rotation angles can be stored in a memory device and the quadrature demodulator used is capable of switching the rotation angle values from one to another.

Now, the reason why sampling is done properly at the samplers 101 and 201 and the received data can be properly obtained at the first and second wireless digital receivers 21 and 31 by using fi=3.072 [MHz] and fs=24.576 [MHz] will be described. Specifically the reason why the received data can be restored completely as the sampler 101 oversamples a signal whose center frequency is fi=3.072 [MHz] with the sampling frequency fs=24.576 [MHz] while the received data can be restored completely as the sampler 201 undersamples a signal whose center frequency is fi=40.000 [MHz] with the sampling frequency fs=24.576 [MHz] will be described.

A transmitted signal can generally be expressed as shown in Expression 1 below, using a complex signal.

$$\text{Re}[S(t)\exp\{j(\omega ct+\phi)\}]  \qquad \text{Exp. 1}$$

Figure 5:
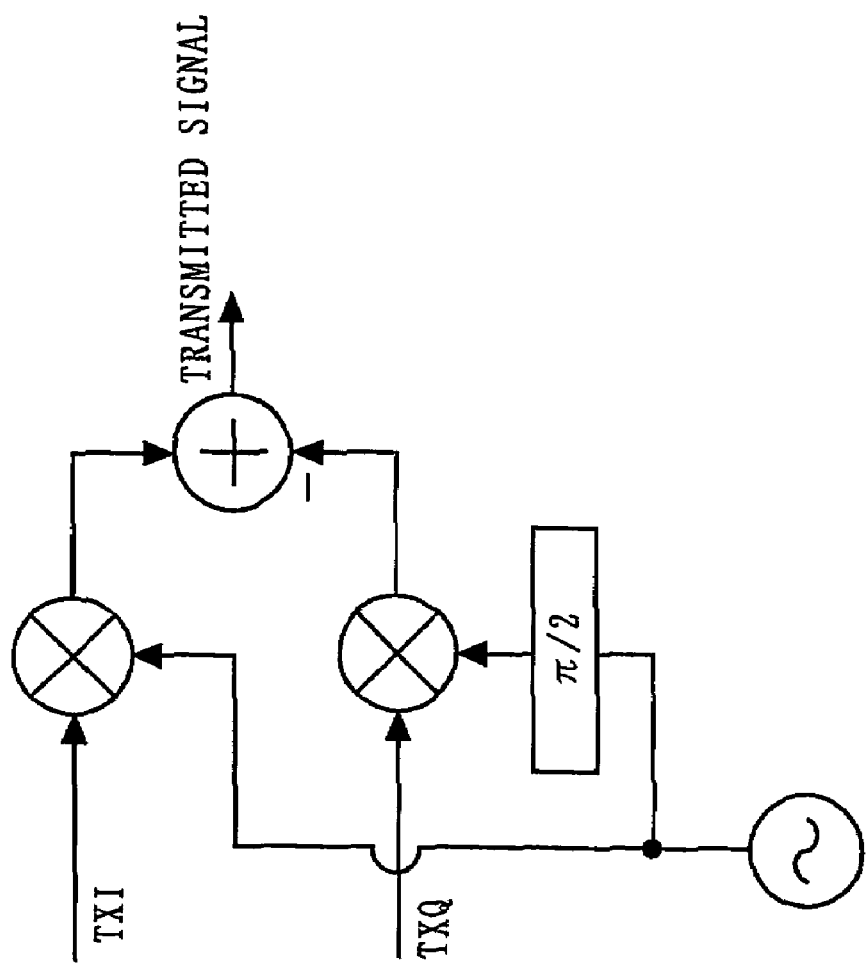
FIG. 5 is a diagram showing a configuration of a quadrature modulator.

This is because the transmitted baseband signal S(t) is, in the first place, a complex signal expressed as TXI+jTxQ, which is quadrature-modulated (multiplied with Expression 2) by using a quadrature modulator as shown in FIG. 5 and then outputted as a radio wave.

$$\exp\{j(\omega ct+\phi)\} \qquad \text{Exp. 2}$$

The receiving side downconverts the transmitted signal by multiplying it with a sine wave. First, the transmitted signal and the sine wave can be expressed by using a complex signal as shown in Expression 3 and Expression 4, respectively.

Transmitted Signal                                             Exp. 3
$$\text{Re}[S(t)\exp\{j(\omega ct+\phi)\}] = \frac{1}{2}\{S(t)\exp\{j(\omega ct+\phi)\} + S^*(t)\exp\{j(\omega ct+\phi)\}^*\}$$

Sine Wave $$\cos\{(\omega c - \omega i)t + \phi\} = \frac{1}{2}\{\exp[j\{(\omega c-\omega i)t+\phi\}] + \exp[j\{(\omega c-\omega i)t+\phi\}]^*\} \qquad \text{Exp. 4}$$

According to Expression 3, the spectrum of the transmitted signal can be expressed on a plane as shown in FIG. 6A where the horizontal axis represents the complex frequency and the vertical axis represents the spectral intensity.

It can be seen from FIG. 6A that the transmitted signal is a signal made up of a spectrum of S(t) at a center angular frequency of +ωc and another spectrum of S*(t) at a center angular frequency of −ωc.

Similarly, it can be seen from Expression 4 that the sine wave is a signal made up of a sine-wave signal whose center angular frequency is +ωc and another sine-wave signal whose center angular frequency is −ωc.

Where the center angular frequency of the local oscillator used for the down conversion is ωc−ωi, the frequency-converted signal obtained by multiplying the transmitted signal by the sine wave can be expressed as shown in Expression 5.

$$\text{Re}[S(t)\exp\{j(\omega ct+\phi)\}]\cos\{(\omega c-\omega i)t+\phi\} = \qquad \text{Exp. 5}$$
$$\frac{1}{4}[S(t)\exp\{j(\omega it+\phi-\phi)\} + S(t)\exp\{j(\omega it+\phi-\phi)\}^*]$$

FIG. 6B diagramatically shows the downconversion represented by Expression 5. It can be seen that when the transmitted signal is frequency-converted so that the center angular frequency is ωi (a frequency value as close to zero as possible while the intended wave does not contain a DC component), an adjacent channel (ch1-) falls into the band of the intended wave, which thus becomes a disturbing wave. In principle, ch1- can be removed by using, for example, an image rejection mixer (see p. 281 of Non-Patent Document 1). In practice, however, the suppression can only be done by about 30 to 40 dB at best due to a quadrature error between the in-phase component and the quadrature component of the quadrature demodulated signal, as known in the art (see Non-Patent Document 2). However, since the adjacent wave selectivity at 5 [MHz] intervals is specified in the DSRC system neither for the base station nor for the mobile station (see STD-T75, Ver. 1.2, P. 33), ch1- does not have to be suppressed completely.

FIG. 7B shows the result of gradually moving away the center angular frequency ωi in the positive direction from its position shown in FIG. 6B. As shown in FIG. 7B, the next adjacent channel ch2- (the next adjacent channel is defined as a 10 [MHz] -interval signal in STD-T75, Ver. 1.2, P. 33) falls into the band of the intended wave. In such a case, if the ch2- removal deteriorates even by a small degree, the margin from the standard 15 dB will decrease, and the standard will no longer be met in worst cases. Therefore, it is preferred that the center angular frequency is as close to zero as possible.

In view of the above, when employing a LOW-IF architecture for the base station of the DSRC system, it is preferred that settings are made so that the adjacent channel ch1-* falls into the intended wave-band. Thus, where the center frequency of the down converted signal is fi, Expression 6 below should be satisfied.

$$Bch \leq fi \leq 2Bch \qquad \text{Exp. 6}$$

where fi=2πωi and 2Bch is bandwidth per channel

Since 2×Bch=5 [MHz] and fd=40.000 [MHz], a comparison between fi and fd yields fi<fd. Therefore, when a signal whose center frequency is fi and another signal whose center frequency is fd are to be sampled with the same sampling frequency, the signal whose center frequency is fi will be oversampled while the signal whose center frequency is fd will be undersampled. A sampling frequency such that the signals will both be oversampled can be used. In such a case, however, the sampling frequency will be very high, and it will be necessary to use a sampler capable of handling high-frequency signals, thereby making it difficult to realize the circuit at a low cost.

Therefore, the signal to be undersampled is a signal whose center frequency is fd. A necessary and sufficient condition for realizing the undersampling operation is Expression 7 and Expression 8 below (see Non-Patent Document 3, p. 123, Expressions B. 12 and B. 16).

$$1 \leq n \leq \frac{fd - Bch}{2Bch} \qquad \text{Exp. 7}$$

$$\frac{2(fd + Bch)}{n+1} \leq fs \leq \frac{2(fd - Bch)}{n} \qquad \text{Exp. 8}$$

Herein, fs represents the sampling frequency.

The signal to be oversampled is a signal whose center frequency is fi. According to the Nyquist's theorem, a necessary and sufficient condition for realizing the oversampling operation is Expression 9 below.

$$fs \geq 2Bch \qquad \text{Exp. 9}$$

Moreover, the condition for easily realizing the demodulation digital circuit is generally represented by Expression 10 below.

$$fs = 2^N fi = 2kfsym \qquad \text{Exp. 10}$$

Herein, N and k are integers, and fsym is a frequency representing the wireless symbol transmission rate.

Expression 8 and Expression 10 yield Expression 11.

$$\frac{2(fd + Bch)}{n+1} \leq 2kfsym \leq \frac{2(fd - Bch)}{n} \qquad \text{Exp. 11}$$

Expression 11 can be rearranged with respect to k, yielding Expression 12.

$$\frac{fd + Bch}{(n+1)fsym} \leq k \leq \frac{fd - Bch}{nfsym} \qquad \text{Exp. 12}$$

The conditions for k will be further discussed. As described above, the undersampling scheme is used for a signal whose center frequency is fd. Considering this fact together with Expression 10 yields Expression 13.

$$fd \geq fs = 2kfsym \qquad \text{Exp. 13}$$

This can be transformed with respect to k, yielding Expression 4.

$$k \leq \frac{fd}{2fsym} \qquad \text{Exp. 14}$$

Note that since Expression 15 holds true except when n=1 (i.e., it holds true when n≧2), Expression 14 is an expression that always holds true as long as Expression 11 holds true.

$$fd > \frac{2(fd - Bch)}{n} \qquad \text{Exp. 15}$$

Rearranging Expression 6 by using Expression 10 yields Expression 16.

$$2^N Bch \leq fs \leq 2^{N+1} Bch \qquad \text{Exp. 16}$$

Next, the condition under which Expression 8 and Expression 16 are satisfied at the same time will be considered. First, the condition under which Expression 8 and Expression 16 are not satisfied at the same time will be considered. The condition under which there is no solution that satisfies Expression 8 and Expression 16 at the same time is as shown in Expression 17.

$$2^{N+1} Bch < \frac{2(fd + Bch)}{n+1} \text{ or } 2^N Bch > \frac{2(fd - Bch)}{n} \qquad \text{Exp. 17}$$

Rearranging Expression 17 with respect to N yields Expression 18.

$$N < \log 2\left\{\frac{fd + Bch}{(n+1)Bch}\right\} \text{ or } N > \log 2\left\{\frac{2(fd - Bch)}{nBch}\right\} \qquad \text{Exp. 18}$$

Now, a calculation as shown in Expression 19 below is done for a comparison between antilogarithms in Expression 18.

$$\frac{2(fd-Bch)}{nBch} - \frac{fd+Bch}{(n+1)Bch} = \frac{(n+1)fd-(3n+1)Bch}{n(n+1)Bch} \quad \text{Exp. 19}$$

$$= \frac{fd - \left(3 - \frac{2}{n+1}\right)Bch}{nBch}$$

Since $1 \leq n$ based on Expression 7, $2/(n+1) \leq 1$. Thus, Expression 20 can be obtained from Expression 19.

$$\frac{fd - 3Bch}{nBch} < \frac{fd - \left(3 - \frac{2}{n+1}\right)Bch}{nBch} \leq \frac{fd - 2Bch}{nBch} \quad \text{Exp. 20}$$

Since fd=40.000 [MHz]=16Bch in the DSRC system, the value of Expression 20 is greater than zero. Thus, Expression 21 holds true.

$$\frac{2(fd-Bch)}{nBch} > \frac{fd+Bch}{(n+1)Bch} \quad \text{Exp. 21}$$

Therefore, the condition for satisfying Expression 8 and Expression 16 at the same time can be obtained by negating Expression 18 as shown in Expression 22.

$$\log 2\left\{\frac{fd+Bch}{(n+1)Bch}\right\} \leq N \leq \log 2\left\{\frac{2(fd-Bch)}{nBch}\right\} \quad \text{Exp. 22}$$

Thus, values of fi and fs of the present invention are obtained by first obtaining a value of n that satisfies Expression 7. Then, the value of k that satisfies Expression 12 and Expression 14 is obtained. Then, for the obtained value of n, the value of N that satisfies Expression 22 is obtained. Then, the obtained values of N and k are substituted into Expression 10 to obtain fi. Then, the obtained values of N and fi are substituted into Expression 10 to obtain fs.

Now, values of fi and fs will be obtained with an actual DSRC system. In the DSRC system, it is presumed that Bch=2.5 [MHz], fd=40.000 [MHz] and fsym=2.048 [MHz].

First, an integer that satisfies Expression 7 is derived. In the illustrated example, n=1, 2, ..., 7 satisfies Expression 7.

Then, one of the integer values of n is selected, and an integer k that satisfies Expression 12 and Expression 14 is derived. With a certain integer n ($1 \leq n \leq 7$), there may possibly be no integer k that satisfies Expression 12 and Expression 14. Specifically, when n=1, 4, 5 and 7, there is no integer k that satisfies Expression 12 and Expression 14. When n=2, k=7, 8 or 9. When n=3, k=6. When n=6, k=3.

Then, one of the integer values n ($1 \leq n \leq 7$) satisfying Expression 7 is selected, and an integer N that satisfies Expression 22 is derived. When n=1, N=4. When n=2 or 3, N=3. When n=4, 5, 6 or 7, N=2.

Finally, based on Expression 10, the value fi for the integers k and N is obtained, based on which the value fs is obtained.

Table 1 below shows possible combinations of n, k and N, and the values fi and fs therefor.

TABLE 1

| n | N | k | fi[MHz] | fs[MHz] |
|---|---|---|---------|---------|
| 1 | 4 | — | — | — |
| 2 | 3 | 9 | 4.608 | 36.864 |
| 2 | 3 | 7 | 3.584 | 28.672 |
| 2 | 3 | 8 | 4.096 | 32.768 |
| 3 | 3 | 6 | 3.072 | 24.576 |
| 4 | 2 | — | — | — |
| 5 | 2 | — | — | — |
| 6 | 2 | 3 | 3.072 | 12.288 |
| 7 | 2 | — | — | — |

In Table 1, "-" means that there is no value that satisfies the conditions described above.

As can be seen from Table 1, the minimum value for fi is 3.072 [MHz], and as can be seen from the description above with reference to FIG. 6A, FIG. 6B, FIG. 7A and FIG. 7B, the falling of the next adjacent channel ch2- into the intended wave band is least significant when fi is 3.072 [MHz]. Thus, the following description will be limited to a case where fi is 3.072 [MHz]. When fi is 3.072 [MHz], fs is 24.576 [MHz] or 12.288 [MHz] based on Table 1. In the present embodiment, 24.576 [MHz] is used as fs.

The description above shows that the received data can be restored completely as the sampler 101 oversamples a signal whose center frequency is fi=3.072 [MHz] with the sampling frequency fs=24.576 [MHz] while the received data can be restored completely as the sampler 201 undersamples a signal whose center frequency is fi=40.000 [MHz] with the sampling frequency fs=24.576 [MHz] While fi=3.072 [MHz] and fs=24.576 [MHz] in the illustrated example, a combination of fi=3.072 [MHz] and fs=12.288 [MHz] may also be used as can be seen from Table 1. Moreover, as can be seen from Table 1, other possible combinations include: fi=4.608 [MHz] and fs=36.864 [MHz]; fi=4.096 [MHz] and fs=36.768 [MHz]; and fi=3.584 [MHz] and fs=28.672 [MHz]. Note that fd=40.000 [MHz] in any case.

Figure 8:
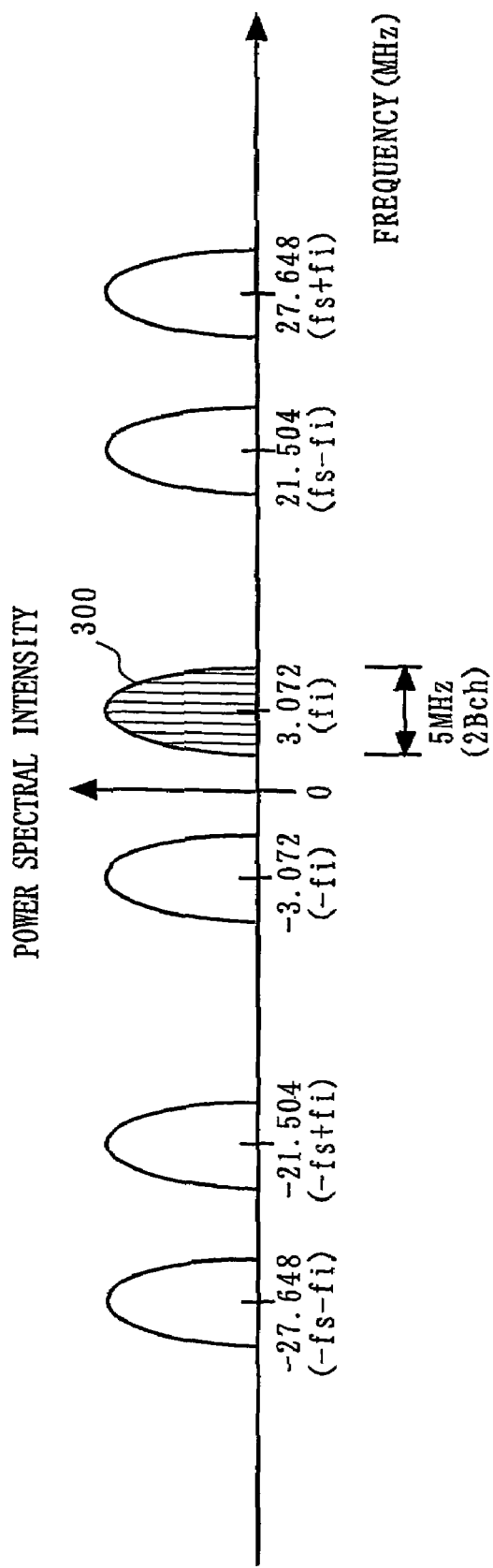
FIG. 8 is a diagram showing the spectrum of a sampled signal S1($m$Ts) outputted from a sampler 101.

FIG. 8 is a diagram showing the spectrum of the sampled signal S1($m$Ts) outputted from the sampler 101. In FIG. 8, the horizontal axis represents the complex frequency and the vertical axis represents the power spectral intensity.

In FIG. 8, 2Bch represents the channel bandwidth, and 2Bch=5 [MHz] in the DSRC system. In FIG. 8, a spectrum 300 represents the spectrum of the modulated low-frequency signal L1($t$). The other spectra are folding spectra occurring as a result of sampling the modulated low-frequency signal L1($t$) with a sampling period of Ts. The figure shows, as folding spectra, a signal whose center frequency is fs±fi and another signal whose center frequency is −fs±fi.

The quadrature demodulator 102 receives the sampled signal S1($m$Ts) outputted from the sampler 101, and outputs two signals whose phases are different from each other by π/2 [rad], i.e., the in-phase component sampled signal I1($m$Ts) and the quadrature component sampled signal Q1($m$Ts). Specifically, the quadrature demodulator 102 performs an operation S1($m$Ts)×exp(−jθ×mTs) by using θ[rad] expressed as shown in Expression 23 to obtain the in-phase component sampled signal I1($m$Ts) and the quadrature component sampled signal Q1($m$Ts).

$$\theta = \frac{1}{2^{N-1}}\pi \quad \text{Exp. 23}$$

Herein, N is as shown in Table 1. Specifically, where fi=3.072 [MHz] and fs=24.576 [MHz], N=3. Where fi=3.072 [MHz] and fs=12.288 [MHz], N=2. Where fi=4.608 [MHz] and fs=36.864 [MHz], N=3.

For example, a signal Sb(mTs) whose center frequency is fb [Hz] being not zero and which has been sampled with the sampling frequency fs can be converted to a signal whose center frequency is zero using a digital circuit by multiplying Sb(mTs) by exp(−j2π×fb/fs×t) and shifting the frequency by fb in the positive direction. While t represents the time, inside a digital circuit whose sampling frequency is fs, t cannot take continuous values but takes discrete values at regular intervals of Ts. Therefore, for every Ts, the value by which Sb(mTs) should be multiplied is expressed as shown in Expression 24.

$$\exp\left(-j2\pi\frac{fb}{fs}m\right) \qquad \text{Exp. 24}$$

Thus, Sb(mTs) whose center frequency is fb can be converted to a signal whose center frequency is zero by performing an operation as shown in Expression 25.

$$Sb(mTs) \times \exp\left(-j2\pi\frac{fb}{fs}m\right) \qquad \text{Exp. 25}$$

Expanding the exp term using the Euler's formula yields Expression 26.

$$\exp\left(-j2\pi\frac{fb}{fs}m\right) = \cos\left\{\left(2\pi\frac{fb}{fs}\right)m\right\} - j\sin\left\{\left(2\pi\frac{fb}{fs}\right)m\right\} \qquad \text{Exp. 26}$$

Figure 9:
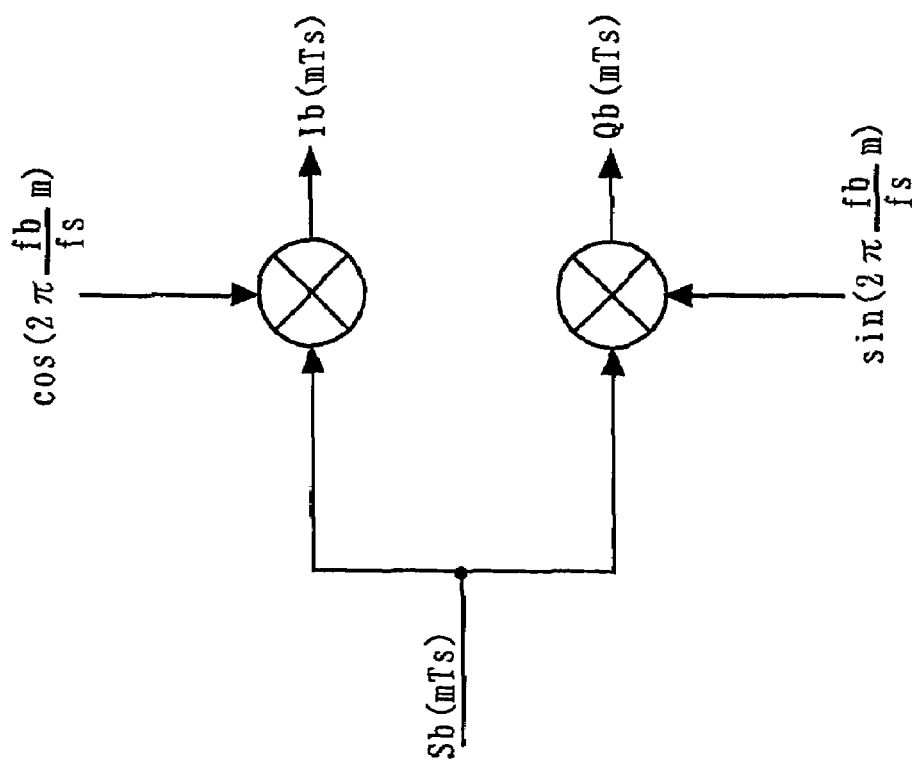
FIG. 9 is a diagram showing a configuration of a quadrature demodulator.

Thus, the operation of Expression 25 can be realized by using a circuit configuration as shown in FIG. 9. FIG. 9 is a schematic diagram showing a configuration of a circuit for shifting the frequency by −fb to obtain a signal whose center frequency is zero. As shown in FIG. 9, the circuit outputs Ib(mTs) being an in-phase component of Sb(mTs) and Qb(mTs) being a quadrature component thereof. Therefore, the circuit shown in FIG. 9 can be considered a quadrature demodulator. Thus, FIG. 9 shows an internal configuration of the quadrature demodulators 102 and 202.

Therefore, θ in the operation S1(mTs)×exp(−jθ×m) performed by the quadrature demodulator 102 is determined as shown in Expression 27 below based on Expression 10.

$$\theta = 2\pi\frac{fb}{fs} = 2\pi\frac{fi}{fs} = 2\pi\frac{fi}{2^N fi} = \frac{1}{2^{N-1}}\pi \qquad \text{Exp. 27}$$

It can be seen that Expression 27 is equal to Expression 23.

Thus, as a result of the operation S1(mTs)×exp(−jθ×mTs) performed by the quadrature demodulator 102, the in-phase component sampled signal I1(mTs) and the quadrature component sampled signal Q1(mTs) each have a frequency component that is frequency-shifted so that the center frequency of the spectrum 300 shown in FIG. 8 is zero.

Figure 10:
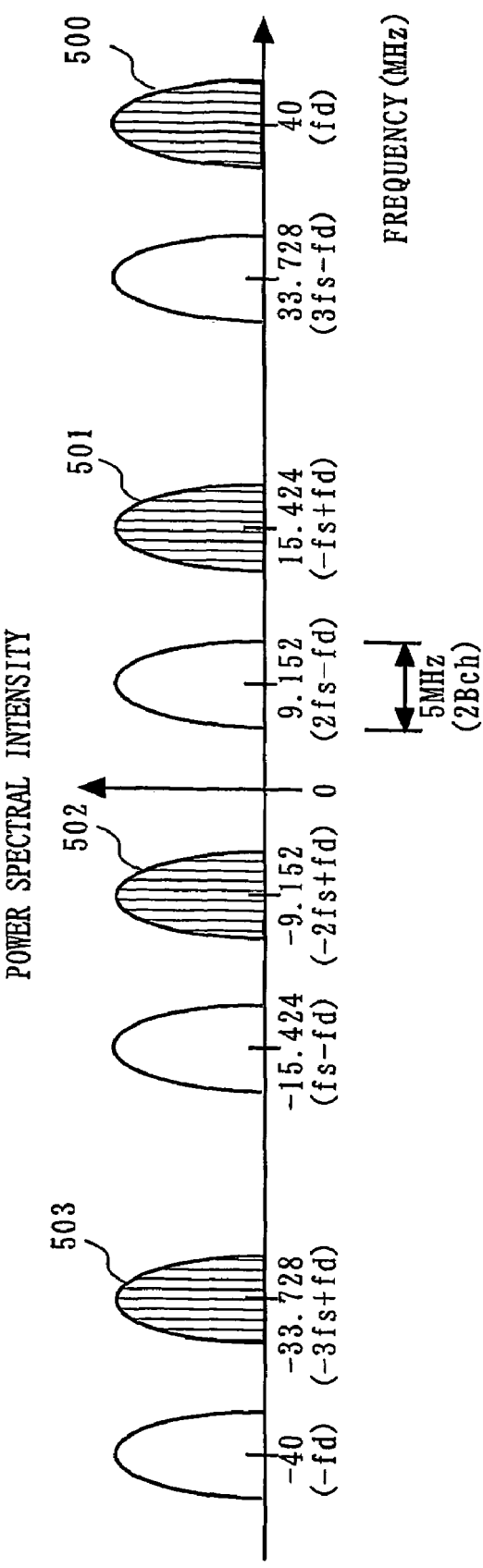
FIG. 10 is a diagram showing the spectrum of a sampled signal S2($m$Ts) obtained by sampling a modulated low-frequency signal L2($t$) whose center frequency is fd=40.000 [MHz] with the sampling frequency fs=24.576 [MHz]

FIG. 10 is a diagram showing the spectrum of the sampled signal S2(mTs) obtained by sampling the modulated low-frequency signal L2(t) whose center frequency is fd=40.000 [MHz] with the sampling frequency fs=24.576 [MHz]. In FIG. 10, the horizontal axis represents the complex frequency. The vertical axis represents the power spectral intensity.

In FIG. 10, a spectrum 500 represents the spectrum of the modulated low-frequency signal L2(t), and the other spectra are folding spectra occurring as a result of sampling the modulated low-frequency signal L2(t) with a sampling period of Ts. Spectra 501, 502 and 503 are each spaced away from the spectrum 500 by a distance of an integer multiple of the sampling frequency, and thus the spectra 500, 501, 502 and 503 are signals equivalent to one another.

However, the other spectra are not spaced apart from the spectrum 500 representing the modulated low-frequency signal L2(t) by an integer multiple of the sampling frequency, and thus are spectra of signals each having a frequency component different from the spectrum 500.

As described above, the spectrum 500 is the same as the spectrum 502. The quadrature demodulator 202 performs an operation S2(mTs)×exp(−jη×m) using η [rad] expressed as shown in Expression 28 to obtain the in-phase component sampled signal I2(mTs) and the quadrature component sampled signal Q2(mTs) each having a frequency component that is frequency-shifted so that the center frequency of the spectrum 502 shown in FIG. 10 is zero.

$$\eta = -\frac{Mfs - fd}{fs}2\pi \qquad \text{Exp. 28}$$

The basis for Expression 28 will now be described. The signal S2(mTs) outputted from the sampler 201 is equivalent to the spectrum 500, as shown in FIG. 10, and includes a signal whose center frequency is closest to zero. The center frequency of this signal can be expressed as −Mfs+fd using a positive integer M. In FIG. 10, M=2. It can be seen from Expression 29 that a signal whose center frequency is −Mfs+fd can be frequency-shifted to a signal whose center frequency is zero by using η in Expression 28 above.

$$\eta = 2\pi\frac{fb}{fs} = 2\pi\frac{-Mfs + fd}{fs} = -\frac{Mfs - fd}{fs}2\pi \qquad \text{Exp. 29}$$

Figure 11:
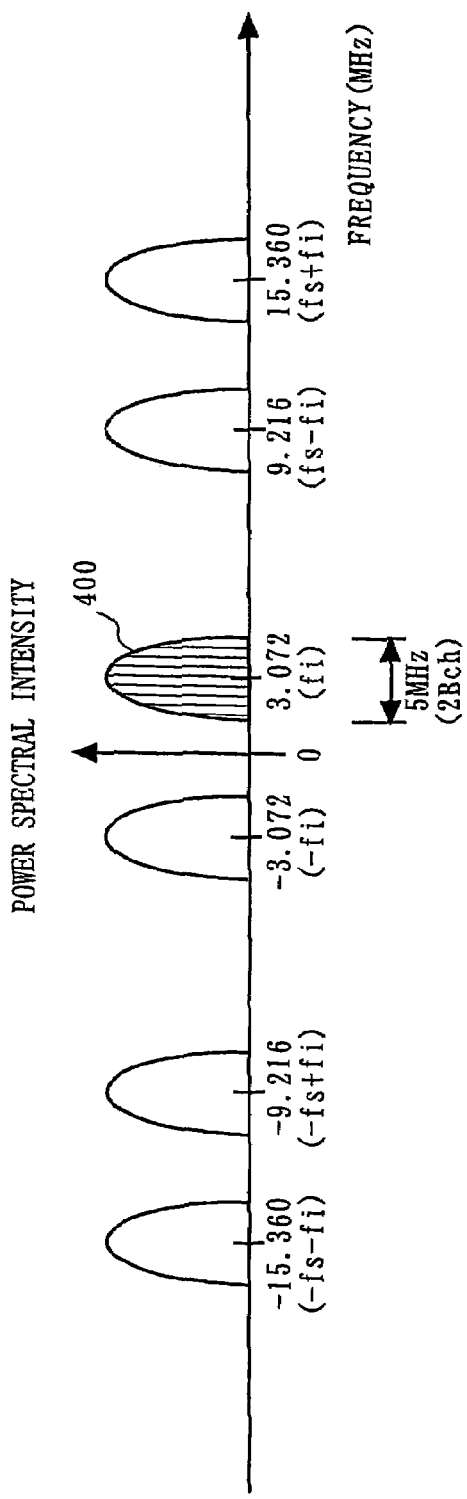
FIG. 11 is a diagram showing the spectrum of the sampled signal S1($m$Ts) outputted from the sampler 101 where the center frequency of a modulated low-frequency signal L1($t$) is fi=3.072 [MHz] and the sampling frequency fs is set to 12.288 [MHz]

As described above, also where fi=3.072 [MHz] and fs=12.288 [MHz], the received data can be properly obtained by performing a similar operation. FIG. 11 is a diagram showing the spectrum of the sampled signal S1(mTs) outputted from the sampler 101 in a case where the center frequency of the modulated low-frequency signal L1(t) is fi=3.072 [MHz] and the sampling frequency fs is 12.288 [MHz]. In FIG. 11, the horizontal axis represents the complex frequency and the vertical axis represents the power spectral intensity.

In FIG. 11, 2Bch represents the channel bandwidth, and 2Bch=5 [MHz] in the DSRC system. In FIG. 11, a spectrum 400 represents the spectrum of the modulated low-frequency signal L1(t). The other spectra are folding spectra occurring as a result of sampling the modulated low-frequency signal L1(t) with a sampling period of Ts. The figure shows, as folding spectra, a signal whose center frequency is fs±fi and another signal whose center frequency is −fs±fi.

The quadrature demodulator 102 receives the sampled signal S1(mTs) outputted from the sampler 101, and outputs two signals whose phases are different from each other by π/2 [rad], i.e., the in-phase component sampled signal I1(mTs) and the quadrature component sampled signal Q1(mTs). The quadrature demodulator 102 can be configured to perform an operation $S1(mTs) \times \exp(\times j\theta \times m)$ using $\theta$ [rad] expressed as shown in Expression 23, as described above, to obtain the in-phase component sampled signal $I1(mTs)$ and the quadrature component sampled signal $Q1(mTs)$. Also in such a case, by using the low-pass filter 103 having pass-band characteristics as shown in FIG. 3, it is possible to obtain $Ib1(mTs)$ being an in-phase component signal of the baseband quadrature demodulated signal and $Qb1(mTs)$ being a quadrature component signal thereof each having only a frequency component that is frequency-shifted so that the center frequency of the spectrum 400 is zero. Thus, the received data can be obtained by the received data reproducing section 105.

Figure 12:
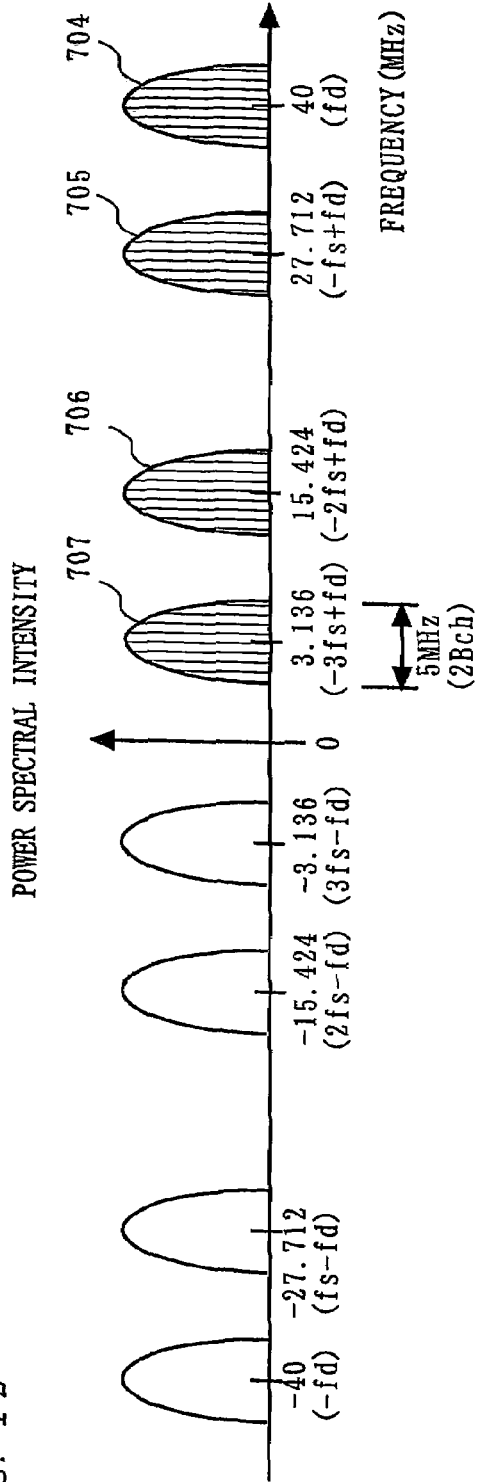
FIG. 12 is a diagram showing the spectrum of the sampled signal S2($m$Ts) obtained by sampling the modulated low-frequency signal L2($t$) whose center frequency is fd=40.000 [MHz] with the sampling frequency fs=12.288 [MHz]

FIG. 12 is a diagram showing the spectrum of the sampled signal $S2(mTs)$ obtained by sampling the modulated low-frequency signal $L2(t)$ whose center frequency is fd=40.000 [MHz] with the sampling frequency fs=12.288 [MHz]. In FIG. 12, the horizontal axis represents the complex frequency. The vertical axis represents the power spectral intensity.

In FIG. 12, a spectrum 704 represents the spectrum of the modulated low-frequency signal $L2(t)$, and the other spectra are folding spectra occurring as a result of sampling the modulated low-frequency signal $L2(t)$ with a sampling period of Ts. Spectra 705, 706 and 707 are each spaced away from the spectrum 704 by a distance of an integer multiple of the sampling frequency, and thus the spectra 704, 705, 706 and 707 are signals equivalent to one another.

However, the other spectra are not spaced apart from the spectrum 704 representing the modulated low-frequency signal $L2(t)$ by an integer multiple of the sampling frequency, and thus are spectra of signals each having a frequency component different from the spectrum 704.

As described above, the spectrum 704 is the same as the spectrum 707. The quadrature demodulator 202 performs an operation $S2(mTs) \times \exp(-j\eta \times m)$ using $\eta$ [rad] expressed as shown in Expression 28 to obtain the in-phase component sampled signal $I2(mTs)$ and the quadrature component sampled signal $Q2(mTs)$ each having a frequency component that is frequency-shifted so that the center frequency of the spectrum 707 shown in FIG. 12 is zero. In this case, since the spectrum 707 is frequency-shifted so that the center frequency thereof is zero, M=3 in Expression 28.

Also where fi=4.608 [MHz] and fs=36.864 [MHz], the received data can be properly obtained at the first and second wireless digital receivers 21 and 31 similarly by determining the rotation angles $\theta$ and $\eta$ at the quadrature demodulators 102 and 202 and performing the quadrature demodulation.

Thus, in the first embodiment, the sampling frequency in the base station and that in the mobile station are both set to the same value fs [Hz] being an even-number multiple of the wireless symbol transmission rate such that oversampling is done in the base station while undersampling is done in the mobile station. Moreover, the center frequency fi [Hz] of a signal that has been downconverted in the base station is ½ to 1 times the frequency corresponding to the bandwidth of the transmitted/received wireless signal and is $½^N$ (N is a natural number) times the sampling frequency. For example, fi=3.072 [MHz] and fs=24.576 [MHz]. Alternatively, fi=3.072 [MHz] and fs=12.288 [MHz]. Alternatively, fi=4.608 [MHz] and fs=36.864 [MHz], fi=3.584 [MHz] and fs=28.672 [MHz], or fi=4.096 [MHz] and fs=32.768 [MHz]. Thus, the demodulation digital circuit in the base station and that in the mobile station can be the same except for using different rotation angles in the quadrature demodulation. Therefore, it is possible to provide wireless digital receivers for the base station and for the mobile station at a low cost while reducing the overall cost of the wireless communications system.

Note that in FIG. 2 being a block diagram showing a functional configuration of the first wireless digital receiver 21, the frequency converter 100, the sampler 101, the quadrature demodulator 102, the low-pass filter 103, the sampling signal generator 104 and the received data reproducing section 105 are typically each implemented in the form of an LSI being an integrated circuit. These components may be individually formed into a separate chip, or some or all of them may be formed together into a single chip.

Moreover, in FIG. 4 being a block diagram showing a functional configuration of the second wireless digital receiver 31, the frequency converter 200, the sampler 201, the quadrature demodulator 202, the low-pass filter 203, the sampling signal generator 204 and the received data reproducing section 205 are typically each implemented in the form of an LSI being an integrated circuit. These components may be individually formed into a separate chip, or some or all of them may be formed together into a single chip.

While the term "LSI" is used herein as the type of integrated circuit used in the present invention, integrated circuits are also called "ICs", "system LSIs", "super LSIs" or "ultra LSIs" depending on the degree of integration. Moreover, the form of an integrated circuit that can be used with the present invention is not limited to an LSI, but may alternatively be a dedicated circuit or a general-purpose processor. It may alternatively be an FPGA (Field Programmable Gate Array) being programmable after the LSI is manufactured, or a reconfigurable processor in which the interconnections and settings of circuit cells in the LSI can be reconfigured. Furthermore, if advancements in the semiconductor technology or derivative technologies bring forth a new form of circuit integration replacing LSIs, the new form of circuit integration can of course be used for the integration of the frequency converter 100, the sampler 101, the quadrature demodulator 102, the low-pass filter 103, the sampling signal generator 104 and the received data reproducing section 105.

Similarly, such a new form of circuit integration can be used for the integration of the frequency converter 200, the sampler 201, the quadrature demodulator 202, the low-pass filter 203, the sampling signal generator 204 and the received data reproducing section 205.

Such a derivative technology may possibly be an application of biotechnology, for example.

Second Embodiment

In the first embodiment, a modulated low-frequency signal obtained by converting the frequency of a modulated high-frequency signal is sampled, and then an in-phase component sampled signal and a quadrature component sampled signal whose phases are different from each other by $\pi/2$ are outputted by the quadrature demodulator, which are then low-pass filtered using a low-pass filter, thereby obtaining the received data. A second embodiment of the present invention is directed to a wireless digital receiver using a complex filter instead of the quadrature demodulator and the low-pass filter to obtain received data. The overall system configuration of the second embodiment is similar to that of the first embodiment, and thus FIG. 1 will be relied upon also in the second embodiment.

Figure 13:
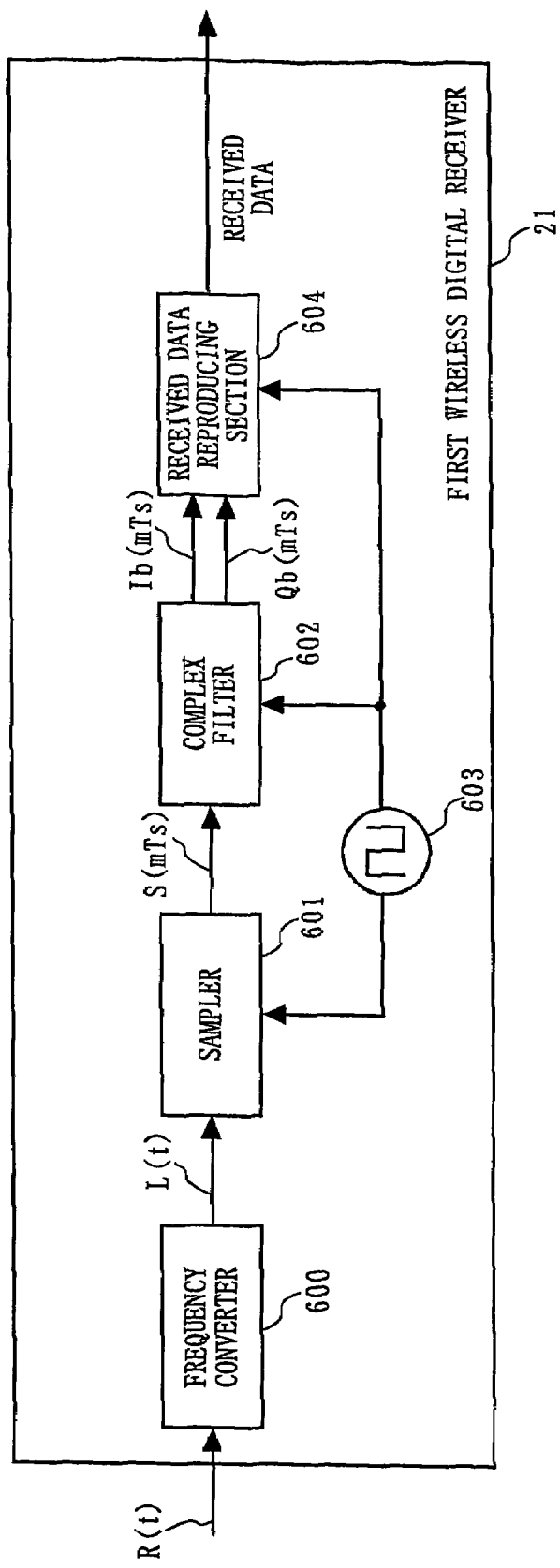
FIG. 13 is a block diagram showing a functional configuration of the first wireless digital receiver 21 according to a second embodiment of the present invention.

FIG. 13 is a block diagram showing a functional configuration of the first wireless digital receiver 21 according to the second embodiment of the present invention. In FIG. 13, the first wireless digital receiver 21 includes a frequency converter 600, a sampler 601, the complex filter 602, a sampling signal generator 603 and a received data reproducing section 604. The complex filter 602 and the received data reproducing section 604 will be hereinafter referred to collectively as a "demodulation digital circuit".

In the first wireless digital receiver 21, the frequency converter 600 converts the frequency of the modulated high-frequency signal R(t) into a modulated low-frequency signal L(t) whose center frequency is fi. The sampler 601 samples the modulated low-frequency signal L(t) with a sampling signal whose sampling frequency is fs outputted from the sampling signal generator 603 to output a sampled signal S(mTs). The operation hitherto is similar to that of the first embodiment.

Therefore, the spectrum of the sampled signal S(mTs) outputted from the sampler 601 is the same as that in a case where the center frequency of the modulated low-frequency signal L(t) is fi=3.072 [MHz] and the sampling frequency is fs=24.576 [MHz], i.e., that shown in FIG. 8. Therefore, FIG. 8 will be relied upon also in the second embodiment.

In FIG. 8, spectra equivalent to the spectrum 300, being the spectrum of the modulated low-frequency signal L(t), are those spaced apart from the spectrum 300 by an integer multiple of the sampling frequency fs=24.576 [MHz]. Thus, the spectrum 300 and the spectrum whose center frequency is −3.072 [MHz] are spectra having different characteristics. In order to obtain received data, the spectrum 300 or a spectrum having a spectrum spaced apart from the spectrum 300 by an integer multiple of the sampling frequency fs as a frequency component should be extracted. FIG. 14 is a diagram showing exemplary pass-band characteristics of the complex filter 602. Where the complex filter 602 having pass-band characteristics as shown in FIG. 14 is used, Ib(mTs) being an in-phase component of the quadrature demodulated signal outputted from the complex filter 602 and Qb(mTs) being a quadrature component thereof are signal shaving the spectrum 300 as a frequency component and whose phases are different from each other by π/2 [rad]. Although the quadrature demodulated signals Ib(mTs) and Qb(mTs) are signals whose center frequencies are not zero, the received data reproducing section 604 can output the received data by means of delay detection, or the like.

In the second embodiment, the configuration of the second wireless digital receiver 31 in the mobile station is similar to the configuration of the first wireless digital receiver 21, and thus FIG. 13 will be relied upon also for the configuration of the second wireless digital receiver 31.

The second wireless digital receiver 31 is different from the first wireless digital receiver 21 in that the modulated high-frequency signal R(t) is converted by the frequency converter 600 to the modulated low-frequency signal L(t) whose center frequency is fd and in that a filter that extracts the spectrum 502 whose center frequency is −9.152 [MHz] as shown in FIG. 10 is used as the complex filter. Otherwise, the first wireless digital receiver 21 is the same as the second wireless digital receiver 31.

Thus, in the second embodiment, the received data can be obtained only by changing the pass-band characteristics of the complex filter, thus obtaining effects similar to those of the first embodiment.

Figure 15A:
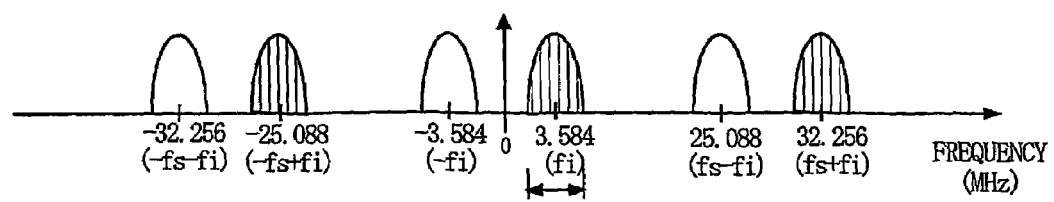
FIG. 15A, FIG. 15B, FIG. 15C, FIG. 15D, FIG. 15E and FIG. 15F are diagrams used for illustrating the pass-band characteristics of the complex filter 602.
Figure 15B:
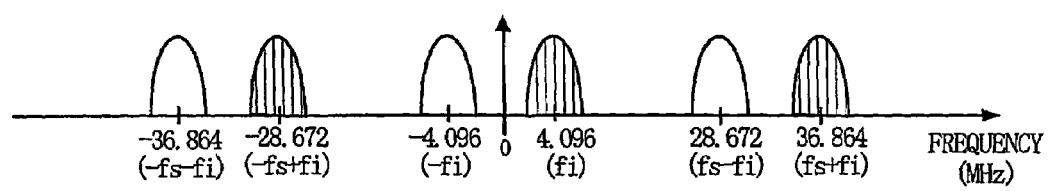
Figure 15C:
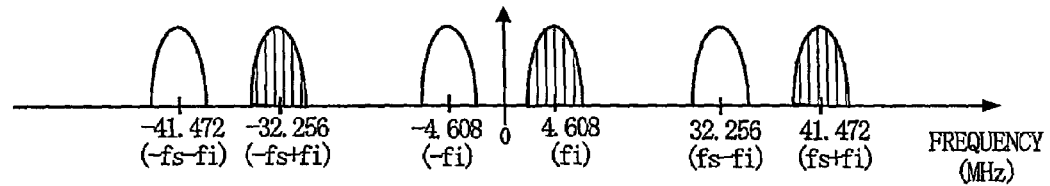

The above description is directed to a case where fs=3.072 [MHz] and fs=24.576 [MHz]. Also where fi=3.072 [MHz] and fs=12.288 [MHz], similar results can be obtained only by changing the center frequency of the pass-band characteristics of the complex filter 602 from 3.072 [MHz] to 3.136 [MHz] (see FIG. 12). Also where fi=3.584 [MHz] and fs=28.672 [MHz], similar results can be obtained only by changing the center frequency of the pass-band characteristics of the complex filter 602 from 3.072 [MHz] to 3.584 [MHz] (see FIG. 15A). Also where fi=4.096 [MHz] and fs=32.768 [MHz], similar results can be obtained only by changing the center frequency of the pass-band characteristics of the complex filter 602 from 3.072 [MHz] to 4.096 [MHz] (see FIG. 15B). Also where fi=4.608 [MHz] and fs=36.864 [MHz], similar results can be obtained only by changing the center frequency of the pass-band characteristics of the complex filter 602 from 3.072 [MHz] to 4.608 [MHz] (see FIG. 15C).

Figure 15D:
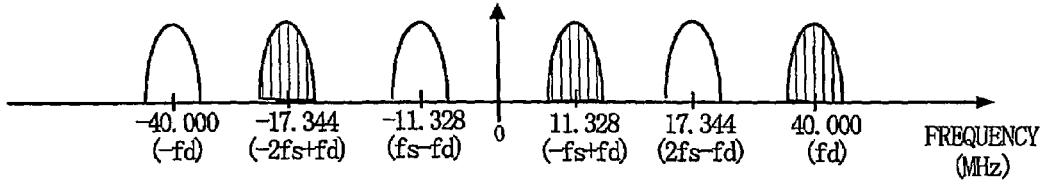
Figure 15E:
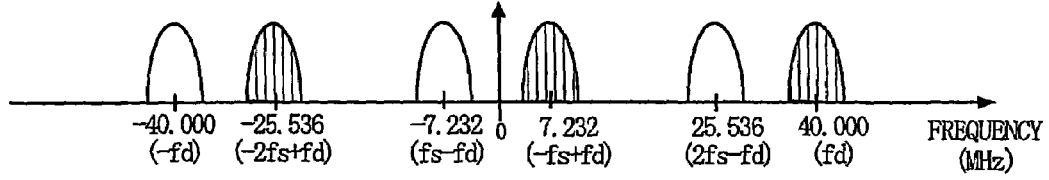
Figure 15F:
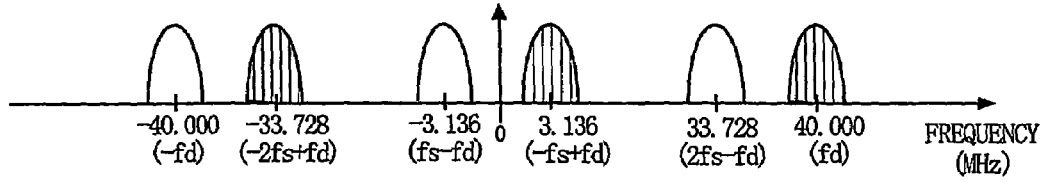

Also where the center frequency of the modulated low-frequency signal L(t) inputted to the sampler 601 is fd=40.000 [MHz] and fs=24.576 [MHz] or fs=12.288 [MHz], similar results can be obtained only by changing the center frequency of the pass-band characteristics of the complex filter 602 to −9.152 [MHz] or 3.136 [MHz], respectively. Also where fd=40.000 [MHz] and fs=28.672 [MHz], similar results can be obtained only by changing the center frequency of the pass-band characteristics of the complex filter 602 to 11.328 [MHz] (see FIG. 15D). Also where fd=40.000 [MHz] and fs=32.768 [MHz], similar results can be obtained only by changing the center frequency of the pass-band characteristics of the complex filter 602 to 7.232 [MHz] (see FIG. 15E) Also where fd=40.000 [MHz] and fs=36.864 [MHz], similar results can be obtained only by changing the center frequency of the pass-band characteristics of the complex filter 602 to 3.136 [MHz] (see FIG. 15F).

As for the complex filter characteristics, in a case where an FIR (Finite Impulse Response) filter is used as the complex filter, for example, the number of taps can be determined in advance so as to accommodate any of the center frequencies of the pass-band characteristics of 3.072 [MHz], 3.136 [MHz] and −9.152 [MHz], whereby all of the cases mentioned above can be addressed only by selecting an appropriate tap coefficient. Thus, by using an FIR with which one of different tap coefficients can be selected, the same demodulation digital circuit, being a complex filter, can be used for the mobile station and for the base station, whereby it is possible to reduce the cost.

Note that in FIG. 13 being a block diagram showing a functional configuration of the first wireless digital receiver 21 according to the second embodiment of the present invention, the frequency converter 600, the sampler 601, the complex filter 602, the sampling signal generator 603 and the received data reproducing section 604 are typically each implemented in the form of an LSI being an integrated circuit. These components may be individually formed into a separate chip, or some or all of them may be formed together into a single chip.

While the term "LSI" is used herein as the type of integrated circuit used in the present invention, integrated circuits are also called "ICs", "system LSIs", "super LSIs" or "ultra LSIs" depending on the degree of integration. Moreover, the form of an integrated circuit that can be used with the present invention is not limited to an LSI, but may alternatively be a dedicated circuit or a general-purpose processor. It may alternatively be an FPGA (Field Programmable Gate Array) being programmable after the LSI is manufactured, or a reconfigurable processor in which the interconnections and settings of circuit cells in the LSI can be reconfigured. Furthermore, if advancements in the semiconductor technology or derivative technologies bring forth a new form of circuit integration replacing LSIs, the new form of circuit integration can of course be used for the integration of the frequency converter 600, the sampler 601, the complex filter 602, the sampling signal generator 603 and the received data reproducing section 604. Such a derivative technology may possibly be an application of biotechnology, for example.

Third Embodiment

FIG. 1 will be relied upon also in a third embodiment of the present invention. FIG. 16A and FIG. 16B are block diagrams each showing a functional configuration of the first wireless digital receiver 21 according to the third embodiment of the present invention.

In FIG. 16A, the first wireless digital receiver 21 includes a frequency converter 800, a sampler 801, the quadrature demodulator 802, an automatic frequency controller 803, a low-pass filter 804, a sampling signal generator 805, a detector 806 and a data determination section 807. The quadrature demodulator 802, the automatic frequency controller 803, the low-pass filter 804, the detector 806 and the data determination section 807 will be hereinafter referred to collectively as a "demodulation digital circuit".

In the third embodiment, the frequency converter 800 does not convert the modulated high-frequency signal R(t) to a modulated low-frequency signal whose center frequency is 3.072 [MHz]. The following description is directed to a case where the frequency converter 800 converts the modulated high-frequency signal R(t) to the modulated low-frequency signal L(t) whose center frequency is fj=3.000 [MHz].

The sampler 801 samples the modulated low-frequency signal L(t) in synchronism with the sampling signal whose frequency is fs=24.576 [MHz] outputted from the sampling signal generator 805 to output the sampled signal S(mTs).

The quadrature demodulator 802 assumes that the center frequency of the modulated low-frequency signal L(t) is fi=3.072 [MHz], and performs an operation S(mTs)×exp(−jθ×mTs) using θ [rad] expressed as shown in Expression 23 to obtain the in-phase component sampled signal I(mTs) and the quadrature component sampled signal Q(mTs).

Figure 17:
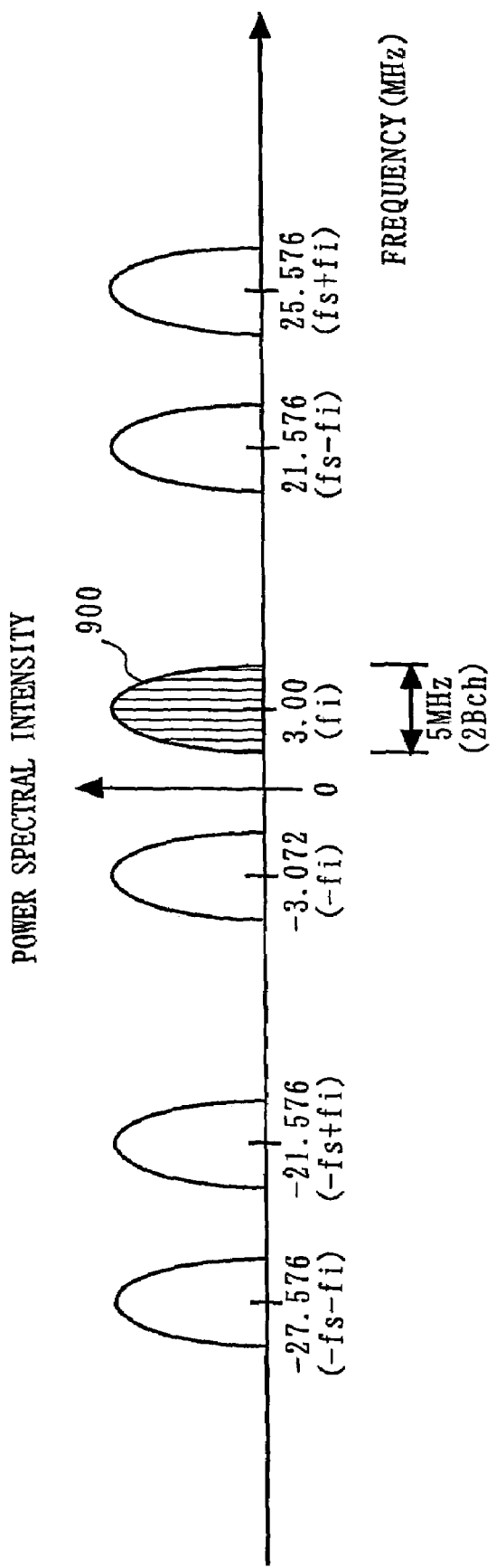
FIG. 17 is a diagram showing the spectrum of an in-phase component sampled signal I(mTs) and a quadrature component sampled signal Q(mTs) outputted from a quadrature demodulator 802.

FIG. 17 is a diagram showing the spectrum of the in-phase component sampled signal I(mTs) and the quadrature component sampled signal Q(mTs) outputted from the quadrature demodulator 802. In FIG. 17, a spectrum 900 is the spectrum of the modulated low-frequency signal L(t). The other spectra are folding spectra occurring as a result of sampling the modulated low-frequency signal L(t) with a sampling period of Ts. A comparison between FIG. 17 and FIG. 8 shows that these spectra as a whole are shifted from each other by 0.072 [MHz], which is the difference between 3.072 [MHz] being the intended frequency of the modulated low-frequency signal L(t) and the actual frequency 3.000 [MHz] thereof.

The automatic frequency controller 803 converts the frequency of the spectrum 900 so that it is frequency-shifted to its intended center frequency of 3.072 [MHz]. In other words, the automatic frequency controller 803 converts the entire spectrum shown in FIG. 17 so that the center frequency of the spectrum 900 is 3.072 [MHz]. Such an automatic frequency controller 803 is disclosed in Japanese Patent No. 3327152, Japanese Laid-Open Patent Publication No. 6-120997, etc.

If the automatic frequency controller 803 performing such an operation is provided between the quadrature demodulator 802 and the low-pass filter 804, the low-pass filter 804 can be a filter having the same pass-band characteristics as those shown in FIG. 3. The detector 806 provided on the output side of the low-pass filter 804 performs a delay detection operation to output detection signals DETI(mTs) and DETQ(mTs) to the data determination section 807. The data determination section 807 detects a phase using the signals DETI(mTs) and DETQ(mTs), and outputs the received data based on the detected phase.

Thus, the third embodiment provides the following advantage. In a case where fi as calculated in the first embodiment cannot be used, e.g., where it is necessary to order a tailored frequency oscillator in order to use fi as calculated in the first embodiment, it is possible to obtain a sampled signal having a component whose center frequency is fi by digitally correcting the frequency with an automatic frequency controller by using a frequency converter capable of converting a frequency to another frequency near fi. Thus, the received data can be properly reproduced. By providing a frequency converter using a general-purpose local oscillator so that a frequency can be converted to another frequency near fi, it is possible to reduce the cost of the wireless digital receiver.

While the above description is directed to a case where the automatic frequency controller 803 is provided immediately after the quadrature demodulator 802, similar effects can be obtained also with a configuration as shown in FIG. 16B. Note however that where a configuration as shown in FIG. 16B is used, it is necessary to use an automatic frequency controller as disclosed in Japanese Patent No. 3088893, Japanese Laid-Open Patent Publication No. 10-98500, etc.

While the above description is directed to a case where the center frequency of the modulated low-frequency signal L(t) is shifted from fi, similar effects can be obtained also where the center frequency of the modulated low-frequency signal L(t) is shifted from fd. Specifically, by performing the frequency shifting operation at the automatic frequency controller 803 so that the center frequency of the spectrum of the modulated low-frequency signal L(t) is equal to fd, pass-band characteristics as shown in FIG. 3 can be used as the pass-band characteristics of the low-pass filter 804, and the received data can be obtained by a delay detection circuit, or the like, provided on the output side of the low-pass filter 804.

While fj=3.000 [MHz] in the above description, the present invention is not limited to this as long as the frequency shift Δf between fi=3.072 and fj satisfies |Δf|<0.512 [MHz]. The reason for this will now be described. A frequency is an amount of phase change per unit time. Therefore, there is a one-to-one correspondence between a frequency shift and a phase shift. The DSRC system uses a format of transmitted data in which the beginning portion of each frame contains a preamble pattern made up of symbols each having a phase different from that of the next symbol by π. By using the preamble pattern, a phase correction of up to ±π/2 (excluding ±π/2) can be performed in principle. Where a phase difference of π/2 is converted to a frequency, the symbol data rate fsym is involved in the conversion formula, whereby the frequency for π/2 varies depending on the value of fsym. This is expressed in Expression 30.

$$\theta err = 2\pi \times \frac{\Delta f}{fs} [\text{rad}] \quad \text{Exp. 30}$$

Herein, θerr is the phase for the frequency shift Δf. In the present embodiment, fsym=2.048 [MHz]. Therefore, where θerr=π/2 and fs=2.048 [MHz], Expression 30 can be rearranged with respect to Δf to yield |Δf|<0.512 [MHz].

The above description is directed to a case where the automatic frequency controller 803 being a circuit for correcting a signal whose center frequency is fj to a signal whose center frequency is fi is provided following the sampler 801. Alternatively, such a frequency correction circuit for correcting a frequency may be provided preceding the sampler 801. Thus, the low-frequency signal downconverted by the frequency converter 800 may be demodulated after being corrected to a signal whose center frequency is fi at a position either preceding or following the sampler 801.

Note that in FIG. 16A being a block diagram showing a functional configuration of the first wireless digital receiver 21 according to the third embodiment of the present invention, the frequency converter 800, the sampler 801, the quadrature demodulator 802, the automatic frequency controller 803, the low-pass filter 804, the sampling signal generator 805, the detector 806 and the data determination section 807 are typically each implemented in the form of an LSI being an integrated circuit. These components may be individually formed into a separate chip, or some or all of them may be formed together into a single chip.

Also where a configuration as shown in FIG. 16B is used, the frequency converter 800, the sampler 801, the quadrature demodulator 802, the automatic frequency controller 803, the low-pass filter 804, the sampling signal generator 805, the detector 806 and the data determination section 807 may be individually formed into a separate chip, or some or all of them may be formed together into a single chip.

While the term "LSI" is used herein as the type of integrated circuit used in the present invention, integrated circuits are also called "ICs", "system LSIs", "super LSIs" or "ultra LSIs" depending on the degree of integration. Moreover, the form of an integrated circuit that can be used with the present invention is not limited to an LSI, but may alternatively be a dedicated circuit or a general-purpose processor. It may alternatively be an FPGA (Field Programmable Gate Array) being programmable after the LSI is manufactured, or a reconfigurable processor in which the interconnections and settings of circuit cells in the LSI can be reconfigured. Furthermore, if advancements in the semiconductor technology or derivative technologies bring forth a new form of circuit integration replacing LSIs, the new form of circuit integration can of course be used for the integration of the frequency converter 800, the sampler 801, the quadrature demodulator 802, the automatic frequency controller 803, the low-pass filter 804, the sampling signal generator 805, the detector 806 and the data determination section 807.

Also where a configuration as shown in FIG. 16B is used, such a new form of circuit integration replacing LSIs brought forth by advancements in the semiconductor technology or derivative technologies may be used for the integration of the frequency converter 800, the sampler 801, the quadrature demodulator 802, the automatic frequency controller 803, the low-pass filter 804, the sampling signal generator 805, the detector 806 and the data determination section 807.

Such a derivative technology may possibly be an application of biotechnology, for example.

Fourth Embodiment

A fourth embodiment of the present invention is directed to a base-station wireless communications device obtained by combining together the first wireless transmitter and the first wireless digital receiver in the base station, and a mobile-station wireless communications device obtained by combining together the second wireless transmitter and the second wireless digital receiver in the mobile station.

Figure 18:
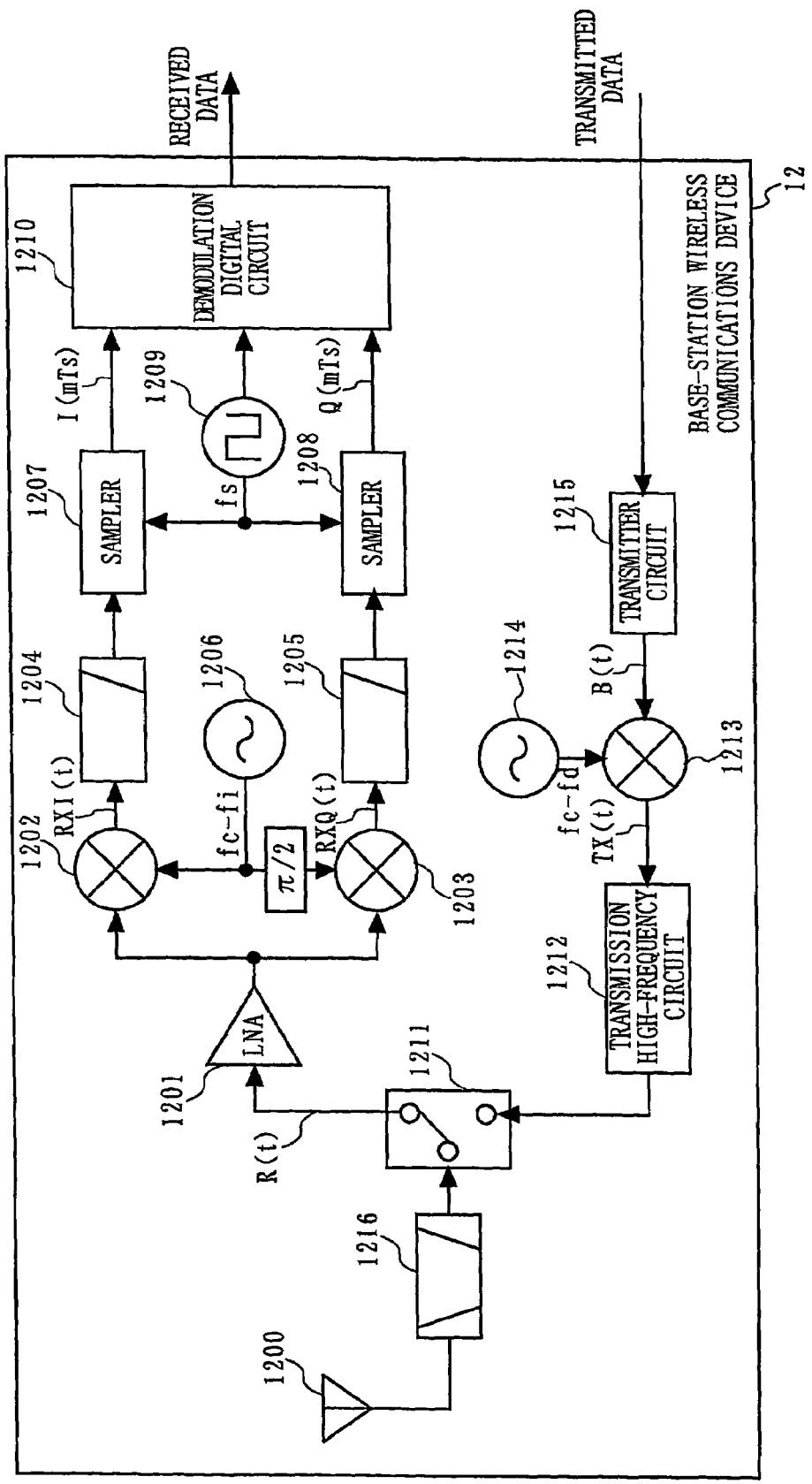
FIG. 18 is a diagram showing a configuration of a base-station wireless communications device 12 according to a fourth embodiment of the present invention.

FIG. 18 is a diagram showing a configuration of a base-station wireless communications device 12 according to the fourth embodiment of the present invention. In FIG. 18, the base-station wireless communications device 12 includes an antenna 1200, a band-pass filter 1216, a transmission/reception selector switch 1211, an amplifier 1201, a first mixer 1202, a second mixer 1203, a first local oscillator 1206, a first low-pass filter 1204, a second low-pass filter 1205, a first sampler 1207, a second sampler 1208, a sampling signal generator 1209, a demodulation digital circuit 1210, a transmission high-frequency circuit 1212, a third mixer 1213, a second local oscillator 1214 and a transmitter circuit 1215.

In the base-station wireless communications device 12, the signal-receiving operation is performed by using the antenna 1200, the band-pass filter 1216, the transmission/reception selector switch 1211, the amplifier 1201, the first mixer 1202, the second mixer 1203, the first local oscillator 1206, the first low-pass filter 1204, the second low-pass filter 1205, the first sampler 1207, the second sampler 1208, the sampling signal generator 1209 and the demodulation digital circuit 1210. The signal-transmitting operation is performed by using the transmitter circuit 1215, the second local oscillator 1214, the third mixer 1213, the transmission high-frequency circuit 1212, the transmission/reception selector switch 1211, the band-pass filter 1216 and the antenna 1200.

In the signal-receiving operation, the transmission/reception selector switch 1211 is switched so that the antenna 1200 and the amplifier 1201 are connected to each other. The modulated high-frequency signal R(t) received by the antenna 1200 from the mobile station whose center frequency is fc is first passed through the band-pass filter 1216 to remove signals of frequency bands that are used neither in the base station nor in the mobile station, and is then inputted to the amplifier 1201. The amplifier 1201 amplifies the modulated high-frequency signal R(t) to an appropriate level, and inputs the amplified signal to the first mixer 1202 and the second mixer 1203. The first local oscillator 1206 outputs a sine wave whose center frequency is fc−fi. Herein, fi is 3.072 [MHz] as calculated in the first embodiment.

The first mixer 1202 multiplies the sine wave outputted from the first local oscillator 1206 whose center frequency is fc−fi with the modulated high-frequency signal R(t) to output a modulated low-to-intermediate-frequency signal in-phase component RXI(t) whose center frequency is fi. The first low-pass filter 1204 removes a high-frequency component from the modulated low-to-intermediate-frequency signal in-phase component RXI(t), and passes the filtered signal to the first sampler 1207.

The second mixer 1203 multiplies a signal outputted from the first local oscillator 1206 whose center frequency is fc−fi and whose phase is shifted from that of the sine wave by $\pi/2$ with the modulated high-frequency signal R(t) to output a modulated low-to-intermediate-frequency signal quadrature component RXQ(t) whose center frequency is fi. The second low-pass filter 1205 removes a high-frequency component from the modulated low-to-intermediate frequency signal quadrature component RXQ(t), and passes the filtered signal to the second sampler 1208.

The first sampler 1207 samples the modulated low-to-intermediate-frequency signal in-phase component RXI(t) in synchronism with a signal outputted from the sampling signal generator 1209 whose frequency is fs=24.576 [MHz] to output the in-phase component sampled signal I(mTs).

The second sampler 1208 samples the modulated low-to-intermediate-frequency signal quadrature component RXQ(t) in synchronism with a signal outputted from the sampling signal generator 1209 whose frequency is fs=24.576 [MHz] to output the quadrature component sampled signal Q(mTs).

The demodulation digital circuit 1210 receives the in-phase component sampled signal I(mTs) and the quadrature component sampled signal Q(mTs), and performs a quadrature demodulation operation on the received signals. Then, the demodulation digital circuit 1210 low-pass-filters the demodulated signals to output received data.

In FIG. 18, the first and second mixers 1202 and 1203, the first local oscillator 1206 and the first and second low-pass filters 1204 and 1205 correspond to the frequency converter 100 in the first embodiment. The first and second samplers 1207 and 1208 correspond to the sampler 101 illustrated in the first embodiment. In the fourth embodiment, quadrature data is sampled, unlike in the first embodiment. However, the fourth embodiment is substantially the same as the first embodiment since the values of fi and fs used in the first embodiment are used also in the fourth embodiment. The sampling signal generator 1209 corresponds to the sampling signal generator 104 illustrated in the first embodiment. The demodulation digital circuit 1210 corresponds to the quadrature demodulator 102, the low-pass filter 103 and the received data reproducing section 105 in the first embodiment.

In the signal-transmitting operation, data to be transmitted is modulated according to the π/4 shift QPSK scheme in the transmitter circuit 1215, and is outputted as a transmitted signal B(t). The third mixer 1213 multiplies the transmitted signal B(t) by a signal outputted from the local oscillator 1214 whose center frequency is fc−fd to output a modulated high-frequency signal TX(t). The modulated high-frequency signal TX(t) is passed through the transmission high-frequency circuit 1212 to remove unnecessary frequency components, and adjusted to an appropriate transmission power level, after which the signal is radiated off the antenna 1200 in the form of a radio wave.

Figure 19:
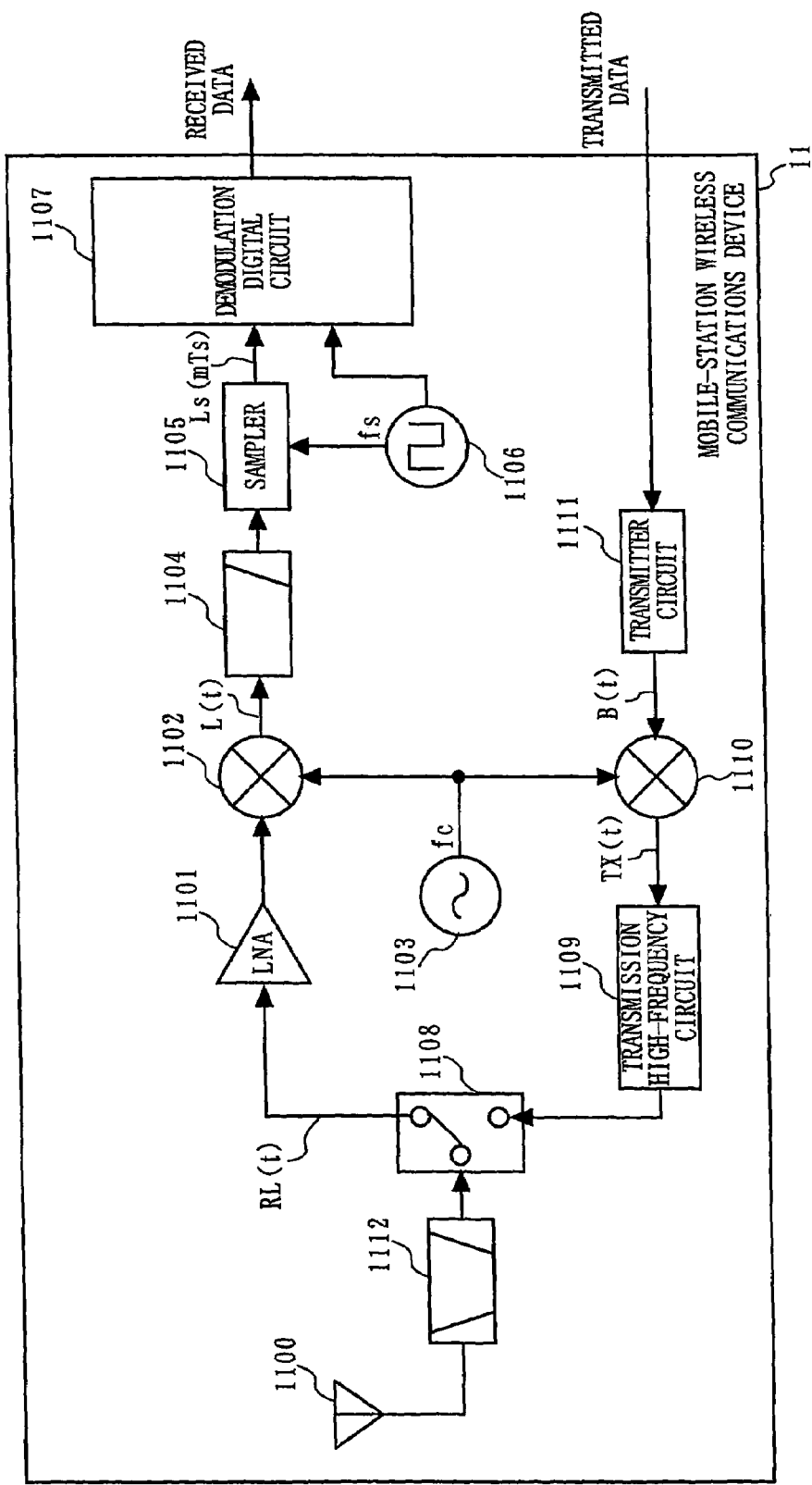
FIG. 19 is a diagram showing a configuration of a mobile-station wireless communications device 11 according to the fourth embodiment of the present invention.
Figure 20:
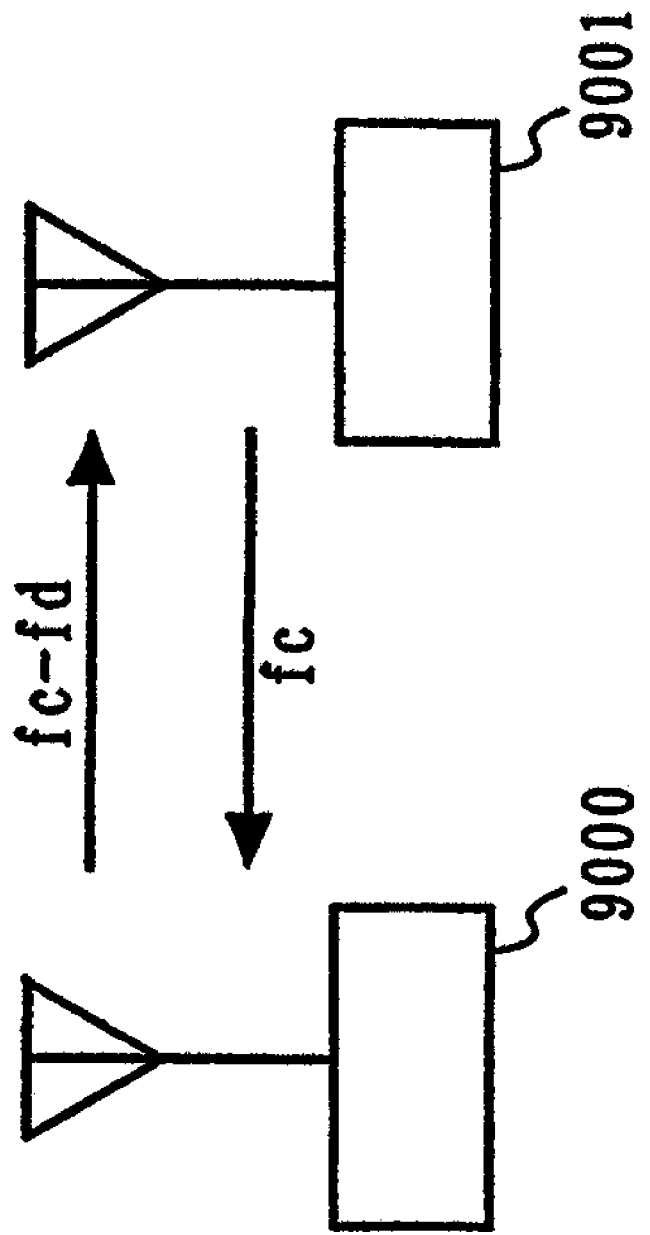
FIG. 20 is a diagram schematically showing a conventional base station 9000 and a conventional mobile station 9001 communicating with each other using the DSRC system.
Figure 21:
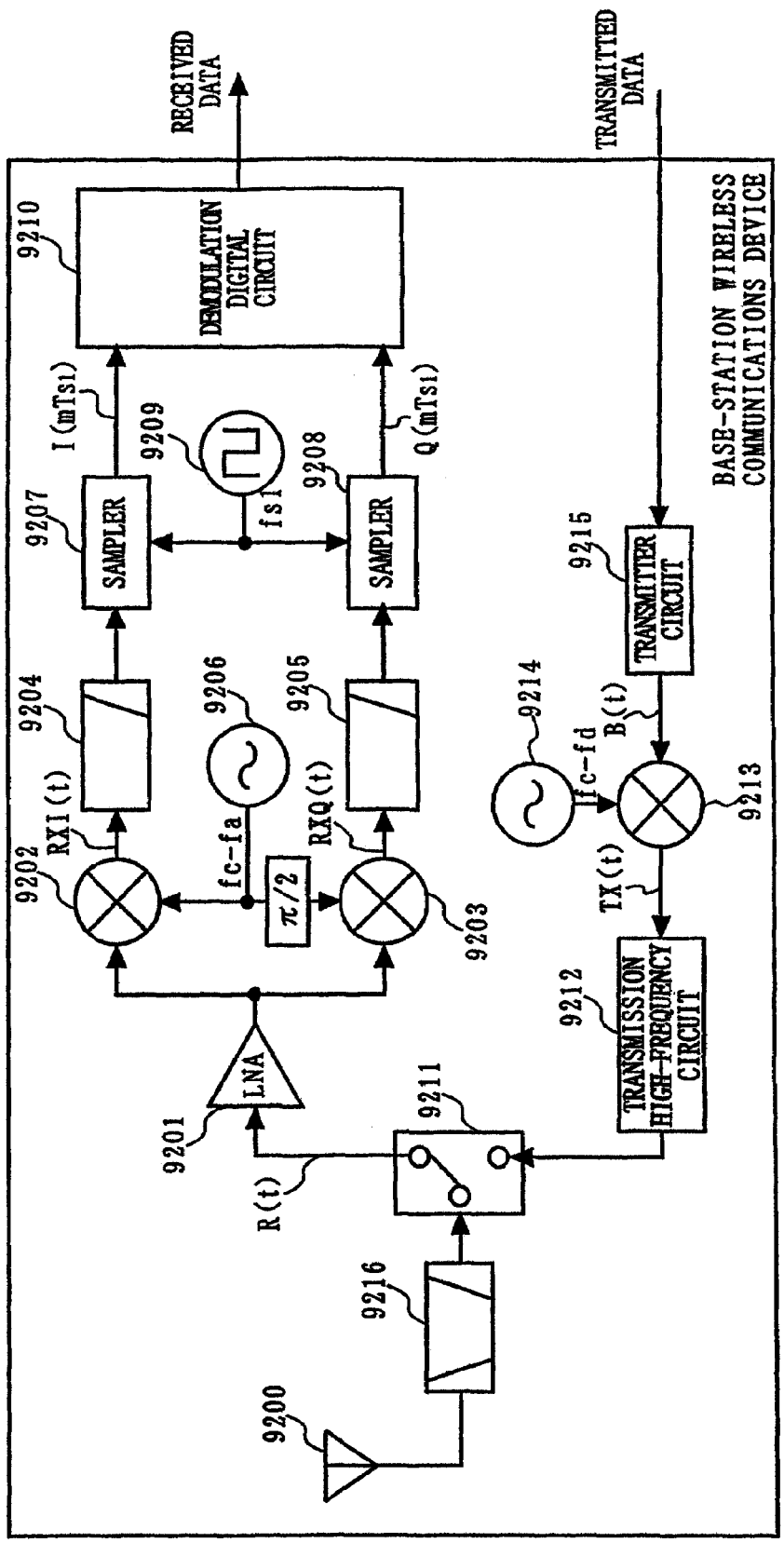
FIG. 21 is a diagram showing a general configuration of a conventional base-station wireless communications device employing the LOW-IF architecture.

FIG. 19 is a diagram showing a configuration of a mobile-station wireless communications device 11 according to the fourth embodiment of the present invention. In FIG. 19, the mobile-station wireless communications device 11 includes an antenna 1100, a band-pass filter 1112, a transmission/reception selector switch 1108, an amplifier 1101, a first mixer 1102, a local oscillator 1103, a low-pass filter 1104, a sampler 1105, a sampling signal generator 1106, a demodulation digital circuit 1107, a transmission high-frequency circuit 1109, a second mixer 1110 and a transmitter circuit 1111.

In the mobile-station wireless communications device, the signal-receiving operation is performed by using the antenna 1100, the band-pass filter 1112, the transmission/reception selector switch 1108, the amplifier 1101, the first mixer 1102, the local oscillator 1103, the low-pass filter 1104, the sampler 1105, the sampling signal generator 1106 and the demodulation digital circuit 1107. The signal-transmitting operation is performed by using the transmitter circuit 1111, the second mixer 1110, the local oscillator 1103, the transmission high-frequency circuit 1109, the transmission/reception selector switch 1108, the band-pass filter 1112 and the antenna 1100.

In the signal-receiving operation, the transmission/reception selector switch 1108 is switched so that the antenna 1100 and the amplifier 1101 are connected to each other. The modulated high-frequency signal RL(t) from the base station received by the antenna 1100 whose center frequency is fc−fd is first passed through the band-pass filter 1112 to remove signals of frequency bands that are used neither in the base station nor in the mobile station, and is then inputted to the amplifier 1101. The amplifier 1101 amplifies the modulated high-frequency signal RL(t) to an appropriate level, and inputs the amplified signal to the first mixer 1102. The first local oscillator 1103 outputs a sine wave whose center frequency is fc.

The first mixer 1102 multiplies the sine wave outputted from the local oscillator 1103 whose center frequency is fc with the modulated high-frequency signal RL(t) to output a modulated low-to-intermediate-frequency signal L(t) whose center frequency is fd to the low-pass filter 1104. In the DSRC system, the frequency difference between the downlink and the uplink is 40.000 [MHz] Therefore, fd=40.000 [MHz]. The low-pass filter 1104 removes a high-frequency component from the modulated low-to-intermediate-frequency signal L(t), and passes the filtered signal to the sampler 1105.

The sampler 1105 samples the modulated low-to-intermediate-frequency signal L(t) in synchronism with a signal outputted from the sampling signal generator 1106 whose frequency is fs=24.576 [MHz] to output a sampled signal Ls(mTs).

The demodulation digital circuit 1107 receives the sampled signal Ls(mTs), and performs a quadrature demodulation operation on the received signal. Then, the demodulation digital circuit 1107 low-pass-filters the demodulated signal to output received data.

In FIG. 19, the first mixer 1102, the local oscillator 1103 and the low-pass filter 1104 correspond to the frequency converter 200 in the first embodiment. The sampler 1105 corresponds to the sampler 201 in the first embodiment. The sampling signal generator 1106 corresponds to the sampling signal generator 204 in the first embodiment. The demodulation digital circuit 1107 corresponds to the quadrature demodulator 202, the low-pass filter 203 and the received data reproducing section 205 in the first embodiment.

In the signal-transmitting operation, data to be transmitted is modulated according to the π/4 shift QPSK scheme in the transmitter circuit 1111, and is outputted as the transmitted signal B(t). The second mixer 1110 multiplies the transmitted signal B(t) by a signal outputted from the local oscillator 1103 whose center frequency is fc to output a modulated high-frequency signal TX(t). The modulated high-frequency signal TX(t) is passed through the transmission high-frequency circuit 1109 to remove unnecessary frequency components, and adjusted to an appropriate transmission power level, after which the signal is radiated off the antenna 1100 in the form of a radio wave.

Thus, in the fourth embodiment, the same sampling frequency is used for the mobile station and for the base station, and thus the same demodulation digital circuit can be used for the mobile station and for the base station, whereby it is possible to provide a wireless communications system and a wireless digital receiver for use therein at a low cost.

Note that the components of the base-station wireless communications device 12 shown in FIG. 18, i.e., the antenna 1200, the band-pass filter 1216, the transmission/reception selector switch 1211, the amplifier 1201, the first mixer 1202, the second mixed 1203, the first local oscillator 1206, the first low-pass filter 1204, the second low-pass filter 1205, the first sampler 1207, the second sampler 1208, the sampling signal generator 1209, the demodulation digital circuit 1210, the transmission high-frequency circuit 1212, the third mixer 1213, the second local oscillator 1214 and the transmitter circuit 1215, are typically each implemented in the form of an LSI being an integrated circuit. These components may be individually formed into a separate chip, or some or all of them may be formed together into a single chip.

Similarly, the components of the mobile-station wireless communications device 11 shown in FIG. 19, i.e., the antenna 1100, the band-pass filter 1112, the transmission/reception selector switch 1108, the amplifier 1101, the first mixer 1102, the local oscillator 1103, the low-pass filter 1104, the sampler 1105, the sampling signal generator 1106, the demodulation digital circuit 1107, the transmission high-frequency circuit 1109, the second mixer 1110 and the transmitter circuit 1111, are typically each implemented in the form of an LSI being an integrated circuit. These components may be individually formed into a separate chip, or some or all of them may be formed together into a single chip.

While the term "LSI" is used herein as the type of integrated circuit used in the present invention, integrated circuits are also called "ICs", "system LSIs", "super LSIs" or "ultra LSIs" depending on the degree of integration. Moreover, the form of an integrated circuit that can be used with the present invention is not limited to an LSI, but may alternatively be a dedicated circuit or a general-purpose processor. It may alternatively be an FPGA (Field Programmable Gate Array) being programmable after the LSI is manufactured, or a reconfigurable processor in which the interconnections and settings of circuit cells in the LSI can be reconfigured. Furthermore, if advancements in the semiconductor technology or derivative technologies bring forth a new form of circuit integration replacing LSIs, the new form of circuit integration can of course be used for the integration of the antenna 1200, the band-pass filter 1216, the transmission/reception selector switch 1211, the amplifier 1201, the first mixer 1202, the second mixer 1203, the first local oscillator 1206, the first low-pass filter 1204, the second low-pass filter 1205, the first sampler 1207, the second sampler 1208, the sampling signal generator 1209, the demodulation digital circuit 1210, the transmission high-frequency circuit 1212, the third mixer 1213, the second local oscillator 1214 and the transmitter circuit 1215.

Similarly, such a new form of circuit integration replacing LSIs brought forth by advancements in the semiconductor technology or derivative technologies may be used for the integration of the antenna 1100, the band-pass filter 1112, the transmission/reception selector switch 1108, the amplifier 1101, the first mixer 1102, the local oscillator 1103, the low-pass filter 1104, the sampler 1105, the sampling signal generator 1106, the demodulation digital circuit 1107, the transmission high-frequency circuit 1109, the second mixer 1110 and the transmitter circuit 1111.

Such a derivative technology may possibly be an application of biotechnology, for example.

While the DSRC system has been described in detail in the first to fourth embodiments, it is understood that a wireless communications system and a wireless data receiver providing similar effects can be obtained with other types of FDD systems.

The various functional blocks mentioned above in the first to fourth embodiments may be any means capable of performing their functions. For example, the frequency converter may be any frequency converting means, the sampler may be any sampling means, the demodulation digital circuit may be any digital demodulating means, the quadrature demodulator may be any quadrature demodulating means, the low-pass filter may be any low-pass filtering means, the received data reproducing section may be any received data reproducing means, and the complex filter may be any complex filtering means. These functional blocks are not limited to any particular types of devices as long as they are operable to perform their functions.

While the invention has been described in detail, the foregoing description is in all aspects illustrative and not restrictive. It is understood that numerous other modifications and variations can be devised without departing from the scope of the invention.

INDUSTRIAL APPLICABILITY

A wireless communications system and a wireless digital receiver for use therein according to the present invention can be provided at a low cost, and are useful in various applications such as a wireless communications application using an FDD architecture.

The invention claimed is:

1. A wireless communications system for transmitting/receiving a first wireless signal from a first wireless communications device and a second wireless signal from a second wireless communications device, the first and second wireless signals having different frequency bands from each other, wherein:

the first wireless communications device includes:
  a first frequency converter operable to downconvert the second wireless signal transmitted from the second wireless communications device to a first low-frequency signal;
  a first sampler operable to oversample the first low-frequency signal downconverted by the first frequency converter; and
  a first demodulation digital circuit operable to demodulate the signal oversampled by the first sampler;

the signal demodulated by the first demodulation digital circuit has a center frequency of fi [Hz];

the second wireless communications device includes:
  a second frequency converter operable to downconvert the first wireless signal transmitted from the first wireless communications device to a second low-frequency signal whose center frequency fd [Hz] is equal to a difference between a center frequency of the first wireless signal and that of the second wireless signal;
  a second sampler operable to undersample the second low-frequency signal downconverted by the second frequency converter; and
  a second demodulation digital circuit operable to demodulate the signal undersampled by the second sampler;

a sampling frequency used in the first sampler and that used in the second sampler are the same sampling frequency fs [Hz];

the sampling frequency fs [Hz] is set to a value that is an even-number multiple of a wireless symbol transmission rate such that oversampling is done in the first sampler and undersampling is done in the second sampler; and the center frequency fi [Hz] is ½ to 1 times a frequency corresponding to a bandwidth of the first and second wireless signals and is $1/2^N$ (N is a natural number) times the sampling frequency fs [Hz].

2. The wireless communications system according to claim 1, wherein where the bandwidth of the first and second wireless signals is 2×Bch [Hz] and the wireless symbol transmission rate is fsym [Hz], the sampling frequency fs [Hz] and the center frequency fi [Hz] are expressed as shown in the following expressions:

$$fi = \frac{2k\,fsym}{2^N}$$

$$fs = 2^N fi$$

where k is an integer satisfying $$\frac{fd + Bch}{(n+1)fsym} \leq k \leq \frac{fd - Bch}{n\,fsym} \qquad \text{Exp. 12}$$

and

-continued $$k \le \frac{fd}{2fsym} \quad \text{Exp. 14}$$

and N is an integer satisfying $$\log 2\left\{\frac{fd + Bch}{(n+1)Bch}\right\} \le N \le \log 2\left\{\frac{2(fd - Bch)}{nBch}\right\} \quad \text{Exp. 22}$$

where n is an integer satisfying $$1 \le n \le \frac{fd - Bch}{2Bch} \quad \text{Exp. 7}$$

3. The wireless communications system according to claim 1, wherein:
the first frequency converter downconverts the second wireless signal transmitted from the second wireless communications device to a first low-frequency signal whose center frequency is fj [Hz]; and
the first low-frequency signal is demodulated by the first demodulation digital circuit after being corrected to a signal whose center frequency is fi [Hz] at a position preceding or following the first sampler.

4. The wireless communications system according to claim 1, wherein:
the center frequency fd is 40.000 [MHz]; and
the frequency fi and the sampling frequency fs are
fi=3.072 [MHz] and fs=24.576 [MHz],
fi=3.072 [MHz] and fs=12.288 [MHz],
fi=4.608 [MHz] and fs=36.864 [MHz],
fi=4.096 [MHz] and fs=32.768 [MHz], or
fi=3.584 [MHz] and fs=28.672 [MHz].

5. The wireless communications system according to claim 1, wherein:
the first demodulation digital circuit includes:
a first quadrature demodulator operable to quadrature-demodulate the signal oversampled by the first sampler;
a first low-pass filter operable to low-pass-filter the signal quadrature-demodulated by the first quadrature demodulator; and
a first received data reproducing section operable to reproduce received data from the signal low-pass-filtered by the first low-pass filter;
the second demodulation digital circuit includes:
a second quadrature demodulator operable to quadrature-demodulate the signal undersampled by the second sampler;
a second low-pass filter operable to low-pass-filter the signal quadrature-demodulated by the second quadrature demodulator; and
a second received data reproducing section operable to reproduce received data from the signal low-pass-filtered by the second low-pass filter;
the first quadrature demodulator converts the signal oversampled by the first sampler to a signal including a component whose center frequency is zero; and
the second quadrature demodulator converts the signal undersampled by the second sampler to a signal including a component whose center frequency is zero.

6. The wireless communications system according to claim 1, wherein:
the first demodulation digital circuit includes:
a first complex filter operable to filter, by using a digital filter, either one of a positive frequency component and a negative frequency component of the signal oversampled by the first sampler whose center frequency is closer to zero; and
a first received data reproducing section operable to reproduce received data from the signal filtered by the first complex filter; and
the second demodulation digital circuit includes:
a second complex filter operable to filter, by using a digital filter, either one of a positive frequency component and a negative frequency component of the signal undersampled by the second sampler whose center frequency is closer to zero; and
a second received data reproducing section operable to reproduce received data from the signal filtered by the second complex filter.

7. The wireless communications system according to claim 3, wherein:
the first demodulation digital circuit includes:
a first quadrature demodulator operable to quadrature-demodulate the signal oversampled by the first sampler;
a first low-pass filter operable to low-pass-filter the signal outputted from the first quadrature demodulator; and
a first received data reproducing section operable to reproduce received data from the signal low-pass-filtered by the first low-pass filter;
the second demodulation digital circuit includes:
a second quadrature demodulator operable to quadrature-demodulate the signal undersampled by the second sampler;
a second low-pass filter operable to low-pass-filter the signal quadrature-demodulated by the second quadrature demodulator; and
a second received data reproducing section operable to reproduce received data from the signal low-pass-filtered by the second low-pass filter;
the first quadrature demodulator converts the signal oversampled by the first sampler to a signal including a component whose center frequency is zero; and
the second quadrature demodulator converts the signal undersampled by the second sampler to a signal including a component whose center frequency is zero.

8. The wireless communications system according to claim 7, wherein the frequency fj [Hz] is 3.000 [MHz].

9. A wireless digital receiver in a wireless communications system for transmitting/receiving a first wireless signal from a first wireless communications device and a second wireless signal from a second wireless communications device, the first and second wireless signals having different frequency bands from each other, the wireless digital receiver receiving the second wireless signal in the first wireless communications device and digitally demodulating the second wireless signal, the wireless digital receiver comprising:
a frequency converter operable to downconvert the second wireless signal transmitted from the second wireless communications device to a low-frequency signal whose center frequency is fi [Hz];
a sampler operable to oversample the low-frequency signal downconverted by the frequency converter; and
a demodulation digital circuit operable to demodulate the signal oversampled by the sampler, wherein:

a sampling frequency used in the sampler and that used in the second wireless communications device are the same sampling frequency fs [Hz];

the sampling frequency fs [Hz] is set to a value that is an even-number multiple of a wireless symbol transmission rate such that oversampling is done in the sampler and undersampling is done in a sampler of the second wireless communications device; and the center frequency fi [Hz] of the low-frequency signal is ½ to 1 times a frequency corresponding to a bandwidth of the first and second wireless signals and is $1/2^N$ (N is a natural number) times the sampling frequency fs [Hz].

10. The wireless digital receiver according to claim 9, wherein where the bandwidth of the first and second wireless signals is 2×Bch [Hz] and the wireless symbol transmission rate is fsym [Hz], the sampling frequency fs [Hz] and the center frequency fi [Hz] of the low-frequency signal are expressed as shown in the following expressions:

$$fi = \frac{2kfsym}{2^N}$$

$$fs = 2^N fi$$

where k is an integer satisfying $$\frac{fd + Bch}{(n+1)fsym} \leq k \leq \frac{fd - Bch}{nfsym} \quad \text{Exp. 12}$$

and $$k \leq \frac{fd}{2fsym} \quad \text{Exp. 14}$$

and N is an integer satisfying $$\log 2\left\{\frac{fd + Bch}{(n+1)Bch}\right\} \leq N \leq \log 2\left\{\frac{2(fd - Bch)}{nBch}\right\} \quad \text{Exp. 22}$$

where n is an integer satisfying $$1 \leq n \leq \frac{fd - Bch}{2Bch} \quad \text{Exp. 7}$$

11. The wireless digital receiver according to claim 9, wherein the center frequency fi and the sampling frequency fs are
fi=3.072 [MHz] and fs=24.576 [MHz],
fi=3.072 [MHz] and fs=12.288 [MHz],
fi=4.608 [MHz] and fs=36.864 [MHz],
fi=4.096 [MHz] and fs=32.768 [MHz], or
fi=3.584 [MHz] and fs=28.672 [MHz].

12. The wireless digital receiver according to claim 9, wherein:
the demodulation digital circuit includes:
a quadrature demodulator operable to quadrature-demodulate the signal oversampled by the sampler;
a low-pass filter operable to low-pass-filter the signal quadrature-demodulated by the quadrature demodulator; and
a received data reproducing section operable to reproduce received data from the signal low-pass-filtered by the low-pass filter; and the quadrature demodulator converts the signal oversampled by the sampler to a signal including a component whose center frequency is zero.

13. The wireless digital receiver according to claim 9, wherein the demodulation digital circuit includes:
a complex filter operable to filter, by using a digital filter, either one of a positive frequency component and a negative frequency component of the signal oversampled by the sampler whose center frequency is closer to zero; and
a received data reproducing section operable to reproduce received data from the signal filtered by the complex filter.

14. A wireless digital receiver in a wireless communications system for transmitting/receiving a first wireless signal from a first wireless communications device and a second wireless signal from a second wireless communications device, the first and second wireless signals having different frequency bands from each other, the wireless digital receiver receiving the first wireless signal in the second wireless communications device and digitally demodulating the first wireless signal, the wireless digital receiver comprising:
a frequency converter operable to downconvert the first wireless signal transmitted from the first wireless communications device to a low-frequency signal whose center frequency fd [Hz] is equal to a difference between a center frequency of the first wireless signal and that of the second wireless signal;
a sampler operable to undersample the low-frequency signal downconverted by the frequency converter; and
a demodulation digital circuit for demodulating operable to demodulate the signal undersampled by the sampler, wherein:
a sampling frequency used in the sampler and that used in the first wireless communications device are the same sampling frequency fs [Hz]; and
the sampling frequency fs [Hz] is set to a value that is an even-number multiple of a wireless symbol transmission rate such that undersampling is done in the sampler and oversampling is done in a sampler of the first wireless communications device.

15. The wireless digital receiver according to claim 14, wherein where the bandwidth of the first and second wireless signals is 2×Bch [Hz] and the wireless symbol transmission rate is fsym [Hz], the sampling frequency fs [Hz] is expressed as shown in the following expression:

fs =2kfsym where k is an integer satisfying $$\frac{fd + Bch}{(n+1)fsym} \leq k \leq \frac{fd - Bch}{nfsym} \quad \text{Exp. 12}$$

and $$k \leq \frac{fd}{2fsym} \quad \text{Exp. 14}$$

where n is an integer satisfying $$1 \leq n \leq \frac{fd - Bch}{2Bch} \quad \text{Exp. 7}$$

16. The wireless digital receiver according to claim 14, wherein:
the center frequency fd is 40.000 [MHz]; and
the sampling frequency fs is 24.576 [MHz], 12.288 [MHz], fs=36.864 [MHz], fs=32.768 [MHz] or fs=28.672 [MHz].

17. The wireless digital receiver according to claim 14, wherein:
   the demodulation digital circuit includes:
      a quadrature demodulator operable to quadrature-demodulate the signal undersampled by the sampler; and
      a low-pass filter operable to low-pass-filter the signal quadrature-demodulated by the quadrature demodulator; and
      a received data reproducing section operable to reproduce received data from the signal low-pass-filtered by the low-pass filter; and
   the quadrature demodulator converts the signal undersampled by the sampler to a signal including a component whose center frequency is zero.

18. The wireless digital receiver according to claim 14, wherein the demodulation digital circuit includes:
   a complex filter operable to filter, by using a digital filter, either one of a positive frequency component and a negative frequency component of the signal undersampled by the sampler whose center frequency is closer to zero; and
   a received data reproducing section operable to reproduce received data from the signal filtered by the complex filter.

19. A wireless digital receiver in a wireless communications system for transmitting/receiving a first wireless signal from a first wireless communications device and a second wireless signal from a second wireless communications device, the first and second wireless signals having different frequency bands from each other, the wireless digital receiver receiving the second wireless signal in the first wireless communications device and digitally demodulating the second wireless signal, the wireless digital receiver comprising:
   a frequency converter operable to downconvert the second wireless signal transmitted from the second wireless communications device to a low-frequency signal whose center frequency is fj [Hz];
   a sampler operable to oversample the low-frequency signal downconverted by the frequency converter; and
   a demodulation digital circuit operable to demodulate the signal oversampled by the sampler after correcting a center frequency thereof to fi [Hz], wherein:
   a sampling frequency used in the sampler and that used in the second wireless communications device are the same sampling frequency fs [Hz];
   the sampling frequency fs [Hz] is set to a value that is an even-number multiple of a wireless symbol transmission rate such that oversampling is done in the sampler and undersampling is done in a sampler of the second wireless communications device; and
   the center frequency fi [Hz] is ½ to 1 times a frequency corresponding to a bandwidth of the first and second wireless signals and is $1/2^N$ (N is a natural number) times the sampling frequency fs [Hz].

20. The wireless digital receiver according to claim 19, wherein where the bandwidth of the first and second wireless signals is 2×Bch [Hz] and the wireless symbol transmission rate is fsym [Hz], the sampling frequency fs [Hz] and the frequency fi [Hz] are expressed as shown in the following expressions:

$$fi = \frac{2k\,fsym}{2^N} \qquad \text{Exp. 12}$$

$$fs = 2^N fi$$

where k is an integer satisfying $$\frac{fd + Bch}{(n+1)fsym} \leq k \leq \frac{fd - Bch}{n\,fsym} \qquad \text{Exp. 12}$$

and $$k \leq \frac{fd}{2fsym} \qquad \text{Exp. 14}$$

and N is an integer satisfying $$\log 2\left\{\frac{fd + Bch}{(n+1)Bch}\right\} \leq N \leq \log 2\left\{\frac{2(fd - Bch)}{nBch}\right\} \qquad \text{Exp. 22}$$

where n is an integer satisfying $$1 \leq n \leq \frac{fd - Bch}{2Bch} \qquad \text{Exp. 7}$$

21. The wireless digital receiver according to claim 19, wherein the demodulation digital circuit includes:
   a quadrature demodulator operable to quadrature-demodulate the signal oversampled by the sampler;
   an automatic frequency controller operable to correct the signal quadrature-demodulated by the quadrature demodulator to a signal having a component whose frequency is fi [Hz];
   a low-pass filter operable to low-pass-filter the signal frequency-corrected by the automatic frequency controller; and
   a received data reproducing section operable to reproduce received data from the signal low-pass-filtered by the low-pass filter.

22. The wireless digital receiver according to claim 19, wherein the frequency fj [Hz] is 3.000 [MHz].

23. An integrated circuit for use in a wireless digital receiver in a wireless communications system for transmitting/receiving a first wireless signal from a first wireless communications device and a second wireless signal from a second wireless communications device, the first and second wireless signals having different frequency bands from each other, the wireless digital receiver receiving the second wireless signal in the first wireless communications device and digitally demodulating the second wireless signal, the integrated circuit comprising:
   a frequency conversion section operable to downconvert the second wireless signal transmitted from the second wireless communications device to a low-frequency signal;
   a sampling section operable to oversample the low-frequency signal downconverted by the frequency conversion section; and
   a demodulation digital section operable to demodulate the signal oversampled by the sampling section, wherein:
   the signal demodulated by the demodulation digital circuit has a center frequency of fi [Hz];
   a sampling frequency used in the sampling section and that used in the second wireless communications device are the same sampling frequency fs [Hz];
   the sampling frequency fs [Hz] is set to a value that is an even-number multiple of a wireless symbol transmission rate such that oversampling is done in the sampling section and undersampling is done in a sampler of the second wireless communications device; and the center frequency fi [Hz] is ½ to 1 times a frequency corresponding to a bandwidth of the first and second wireless signals and is $1/2^N$ (N is a natural number) times the sampling frequency fs [Hz].

24. An integrated circuit for use in a wireless digital receiver in a wireless communications system for transmitting/receiving a first wireless signal from a first wireless communications device and a second wireless signal from a second wireless communications device, the first and second wireless signals having different frequency bands from each other, the wireless digital receiver receiving the first wireless signal in the second wireless communications device and digitally demodulating the first wireless signal, the integrated circuit comprising:

a frequency conversion section operable to downconvert the first wireless signal transmitted from the first wireless communications device to a low-frequency signal whose center frequency fd [Hz] is equal to a difference between a center frequency of the first wireless signal and that of the second wireless signal;

a sampling section operable to undersample the low-frequency signal downconverted by the frequency conversion section; and a demodulation digital section operable to demodulate the signal undersampled by the sampling section, wherein:

a sampling frequency used in the sampling section and that used in the first wireless communications device are the same sampling frequency fs [Hz]; and the sampling frequency fs [Hz] is set to a value that is an even-number multiple of a wireless symbol transmission rate such that undersampling is done in the sampler and oversampling is done in a sampler of the first wireless communications device.

* * * * *